(12) United States Patent
Zheng et al.

(10) Patent No.: US 10,506,241 B2
(45) Date of Patent: Dec. 10, 2019

(54) METHOD FOR DETERMINING BLOCK PARTITION MANNER IN VIDEO CODEC, AND RELATED APPARATUS

(71) Applicant: Huawei Technologies Co., Ltd., Shenzhen, Guangdong (CN)

(72) Inventors: Jianhua Zheng, Beijing (CN); Huanbang Chen, Guangzhou (CN); Fan Liang, Guangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 15/130,035

(22) Filed: Apr. 15, 2016

(65) Prior Publication Data

US 2016/0234511 A1  Aug. 11, 2016

Related U.S. Application Data

(63) Continuation of application No. PCT/CN2014/088799, filed on Oct. 17, 2014.

(30) Foreign Application Priority Data

Oct. 18, 2013  (CN) .......................... 2013 1 0495089

(51) Int. Cl.
 *H04N 19/176*  (2014.01)
 *H04N 19/103*  (2014.01)
 (Continued)

(52) U.S. Cl.
 CPC ......... *H04N 19/176* (2014.11); *H04N 19/103* (2014.11); *H04N 19/119* (2014.11);
 (Continued)

(58) Field of Classification Search
 None
 See application file for complete search history.

(56) References Cited

U.S. PATENT DOCUMENTS

2012/0008676 A1*  1/2012  Lee ..................... H04N 19/137
                                                                 375/240.02
2012/0128067 A1*  5/2012  Liu ..................... H04N 19/159
                                                                 375/240.12

(Continued)

FOREIGN PATENT DOCUMENTS

CN  102984521 A  3/2013
CN  104023234 A  9/2014

OTHER PUBLICATIONS

Shen et al., "An Effective CU Size Decision Method for HEVC Encoders"; IEEE Transactions on Multimedia; vol. 15, No. 2; Feb. 2013; 6 pages.*

(Continued)

*Primary Examiner* — Edemio Navas, Jr.
(74) *Attorney, Agent, or Firm* — Staas & Halsey LLP

(57) ABSTRACT

A method for determining a block partition manner in video encoding including: acquiring processing information of N related blocks of a current block; and determining a block partition manner of the current block according to the processing information of the N related blocks; where the processing information is block partition depth information and/or block encoding mode information, N is a positive integer, and the N related blocks include at least one of the following picture blocks: at least one neighboring block of the current block, a reference block of the current block, and at least one neighboring block of the reference block.

16 Claims, 10 Drawing Sheets

(51) Int. Cl.
*H04N 19/119* (2014.01)
*H04N 19/157* (2014.01)
*H04N 19/33* (2014.01)
*H04N 19/70* (2014.01)
*H04N 19/85* (2014.01)
*H04N 19/196* (2014.01)

(52) U.S. Cl.
CPC ......... *H04N 19/157* (2014.11); *H04N 19/197* (2014.11); *H04N 19/33* (2014.11); *H04N 19/70* (2014.11); *H04N 19/85* (2014.11)

(56) References Cited

U.S. PATENT DOCUMENTS

| | | | |
|---|---|---|---|
| 2012/0183080 A1 | 7/2012 | Zhou | |
| 2012/0229602 A1* | 9/2012 | Chen | H04N 19/597 348/43 |
| 2013/0022129 A1* | 1/2013 | Liu | H04N 19/44 375/240.23 |
| 2013/0128965 A1* | 5/2013 | Zhang | H04N 19/00 375/240.12 |
| 2014/0078254 A1* | 3/2014 | Lin | H04N 19/597 348/43 |

OTHER PUBLICATIONS

Zhang et al., "Fast Encoder Decision for Texture Coding in 3D-HEVC", Joint Collaborative Team on 3D Video Coding Extensions of ITU-T SG 16 WP 3 and ISO/IEC JTC 1/SC, 6 pages.*

Gerhard Tech, et al., "3D-HEVC Draft Text 1", Joint Collaborative Team on 3D Video Coding Extension Development of ITU-T SG 16 WP 3 and ISO/IEC JTC 1/SC 29/WG 11, Jul. 27-Aug. 2, 2013, 89 pages.

Wei Li, et al., "A Fast Mode Decision Algorithm for High Efficiency Video Coding", Journal of Xi'an Jiaotong University, vol. 47, No. 8, Aug. 2013, 10 pages.

Na Zhang, et al., "3D-CE3.h related: Fast encoder decision for texture coding", Joint Collaborative Team on 3D Video Coding Extensions of ITU-T SG 16 WP 3 and ISO/IEC JTC 1/SC 29/WG 11, Jul. 27-Aug. 2, 2013, 6 pages.

"Advanced video coding for generic audiovisual services", Recommendation ITU-T H.264, Apr. 2013, 732 pages.

Liquan Shen et al., "An Effective CU Size Decision Method for HEVC Encoders", IEEE Transactions on Multimedia, vol. 15, No. 2, Feb. 2013, p. 465-470.

Virginie Drugeon et al: "Improvement of inter mode coding and split flags coding for LCEC", (Joint Collaborative Team on Video Goding of ISO/IEC JTC1/SC29/WG11 and ITU-T SG.16); No. JCTVC-E258, Mar. 10, 2011. XP030008764.

* cited by examiner

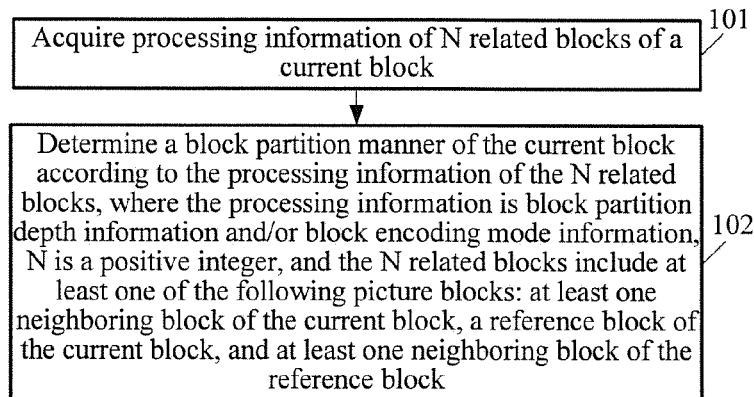
FIG. 1-a
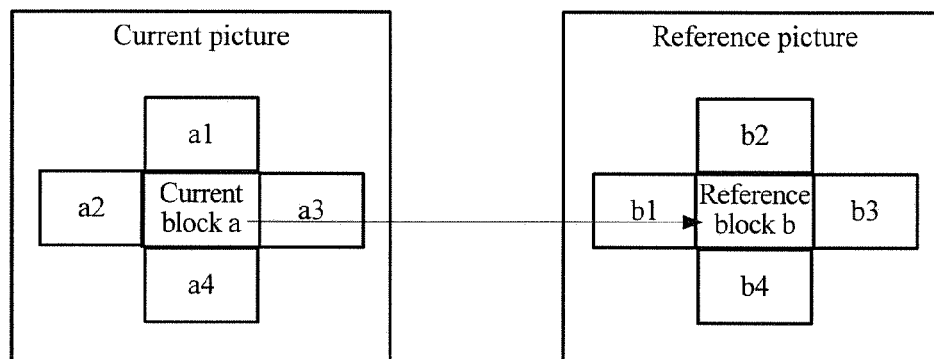
FIG. 1-b
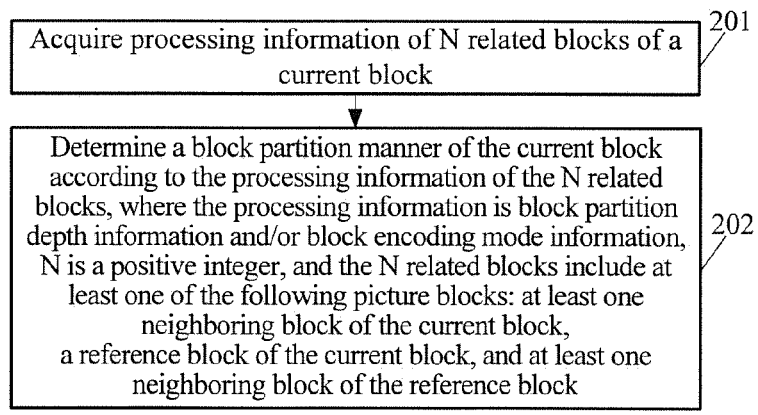
FIG. 2

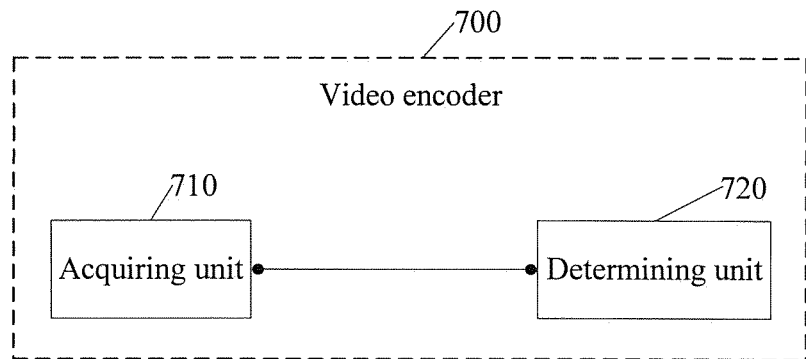
FIG. 7-a
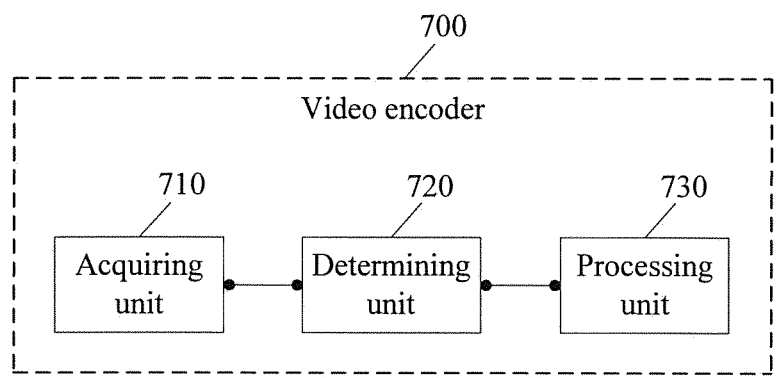
FIG. 7-b
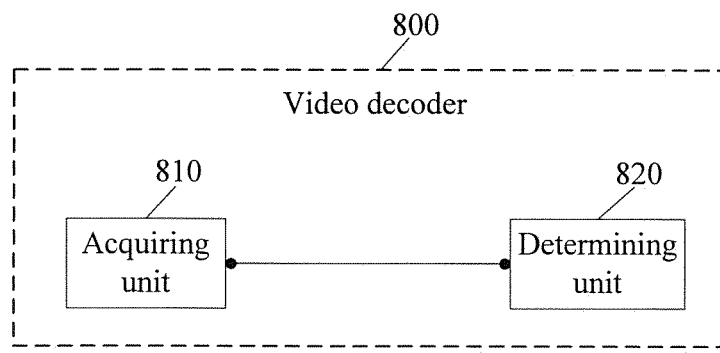
FIG. 8-a

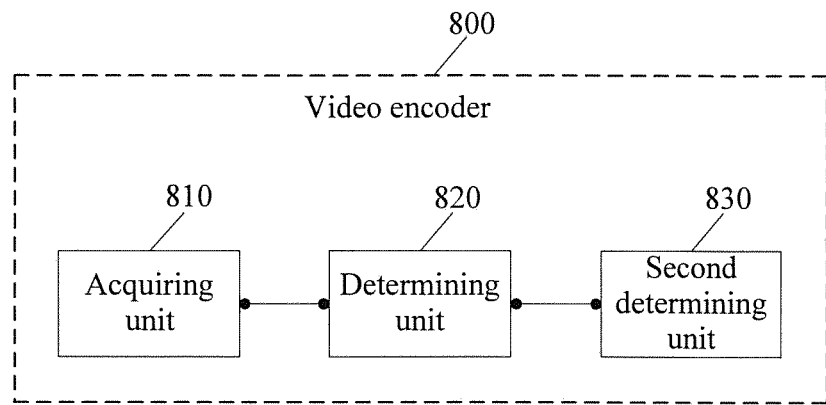
FIG. 8-b
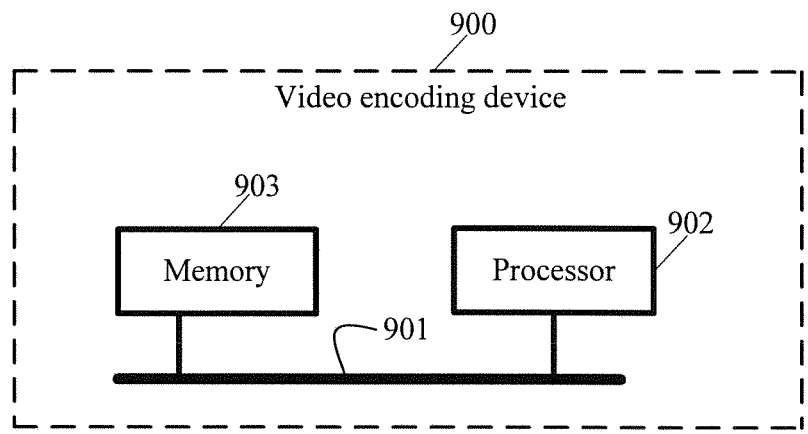
FIG. 9
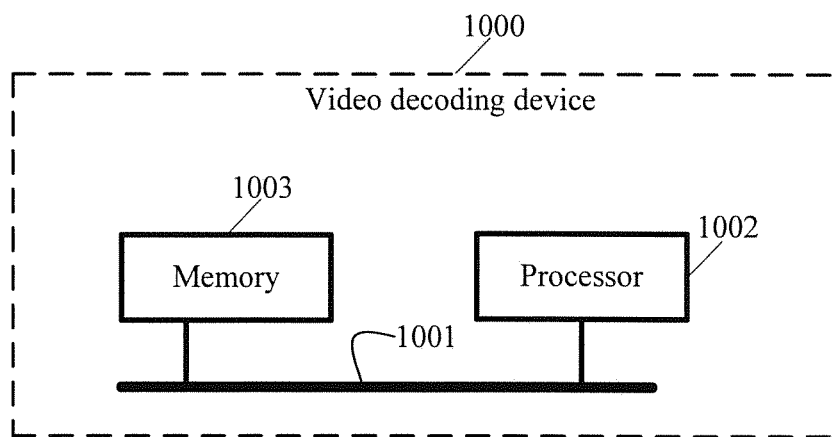
FIG. 10

METHOD FOR DETERMINING BLOCK PARTITION MANNER IN VIDEO CODEC, AND RELATED APPARATUS

CROSS-REFERENCE TO RELATED APPLICATIONS

This application is a continuation of International Application No. PCT/CN2014/088799, filed on Oct. 17, 2014, which claims priority to Chinese Patent Application No. 201310495089.9, filed on Oct. 18, 2013, both of which are hereby incorporated by reference in their entireties.

TECHNICAL FIELD

The present invention relates to the field of image processing technologies, and specifically, to a method for determining a block partition manner in video encoding, a method for determining a block partition manner in video decoding, and a related apparatus.

BACKGROUND

With the development of opto-electronic collection technologies and a continuously increasing high-definition digital video requirement, a video data volume is increasing, and limited heterogeneous transmission bandwidth and diversified video applications continuously pose a higher requirement on video coding efficiency. Therefore, formulation of the High Efficiency Video Coding (HEVC, High Efficient Video Coding) standard needs is started.

A basic principle of video encoding compression is using a spatial domain correlation, a temporal domain correlation, and a code word correlation to eliminate redundancy to an utmost extent. Currently, a popular method is using a block-based hybrid video coding framework to implement video compression by performing steps such as prediction (including intra-frame prediction and inter-frame prediction), transform, quantization, and entropy coding. This video coding framework shows strong vitality, and HEVC still uses this block-based hybrid video coding framework.

In the foregoing coding framework, a video sequence (sequence) includes a series of pictures (picture), and a picture is further partitioned into slices (slice), and a slice is further partitioned into blocks (block). In video encoding, encoding processing may be performed row by row from left to right and from top to bottom by using a block as a unit, starting from an upper-left corner position of a picture. In some new video coding standards, a concept of "Block" is further extended. In the H.264 standard, there is a macro block (MB, Macro Block), and an MB may further be partitioned into multiple partitions (partition, which may be used for predicting coding). In the HEVC standard, basic concepts such as "coding unit" (CU, Coding Unit), "prediction unit" (PU, Prediction Unit), and "transform unit" (TU, Transform Unit) are used; blocks are classified into multiple types of Units in terms of functions, and description is made using a new tree-based structure. For example, a CU may be partitioned into smaller CUs according to a quadtree, and the smaller CUs may further be partitioned, so as to form a quadtree structure. There is also a similar tree structure for a PU and a TU. A CU, a PU, and a TU all essentially fall into a concept of "block" block. A CU is similar to a macro block MB or a coding unit and is a basic unit for partitioning and encoding an picture. A PU may be corresponding to a prediction block, and is a basic unit for prediction and encoding; a CU is further partitioned into multiple PUs according to a partitioning mode. A TU may be corresponding to a transform block and is a basic unit for transforming prediction residual. In the HEVC standard, a CU, a PU, and a TU may be collectively referred to as a coding tree block (CTB, Coding Tree Block), or the like.

In the HEVC standard, a picture block is generally further partitioned in a quadtree partition manner. For example, when an upper-level CU is partitioned into sub-CUs (Sub-CU), a block partition flag (split_flag) is used to indicate whether to further partition a current Sub-CU downward into smaller Sub-CUs. In the prior art, determining whether to further partition a current block requires a calculation of a performance parameter such as rate distortion of multiple blocks. However, calculating, for each time, a performance parameter such as rate distortion of multiple blocks makes a calculation process relatively complex.

SUMMARY

Embodiments of the present invention provide a method for determining a block partition manner in video encoding, a method for determining a block partition manner in video decoding, and a related apparatus, so as to reduce computational complexity in determining a block partition manner of a current block in a video encoding/decoding process.

A first aspect of the embodiments of the present invention provides a method for determining a block partition manner in video encoding, where the method may include:

acquiring processing information of N related blocks of a current block; and determining a block partition manner of the current block according to the processing information of the N related blocks; where the processing information is block partition depth information and/or block encoding mode information, where N is a positive integer, and the N related blocks include at least one of the following picture blocks: at least one neighboring block of the current block, a reference block of the current block, and at least one neighboring block of the reference block.

With reference to the first aspect, in a first possible implementation manner, a block encoding mode indicated by the block encoding mode information is a Merge mode or a Skip mode.

With reference to the first aspect or the first possible implementation manner of the first aspect, in a second possible implementation manner, the determining a block partition manner of the current block according to the processing information of the N related blocks includes: if the processing information is the block partition depth information and a block partition depth of the current block is greater than or equal to a first block partition depth, determining that the block partition manner of the current block is skipping partitioning, where the first block partition depth is greater than or equal to a maximum value of a block partition depth of the N related blocks; or if the processing information is the block encoding mode information and a block encoding mode indicated by block encoding mode information of the N related blocks is the Merge mode, determining that the block partition manner of the current block is skipping partitioning;

or if the processing information is the block partition depth information and the block encoding mode information, a block partition depth of the current block is greater than or equal to a first block partition depth, and a block encoding mode indicated by block encoding mode information of the N related blocks is the Merge mode, determining that the block partition manner of the current block is skipping partitioning, where the first block partition depth is greater than or equal to a maximum value of a block partition depth of the N related blocks.

With reference to the first aspect or the first possible implementation manner of the first aspect or the second possible implementation manner of the first aspect, in a third possible implementation manner, the determining a block partition manner of the current block according to the processing information of the N related blocks includes:

if the processing information is the block partition depth information and a block partition depth of the current block is less than a first block partition depth, determining the block partition manner of the current block according to a first preset condition, where the first block partition depth is greater than or equal to a maximum value of a block partition depth of the N related blocks;

or if the processing information is the block encoding mode information and a block encoding mode indicated by block encoding mode information of at least one block of the N related blocks is not the Merge mode, determining the block partition manner of the current block according to a first preset condition;

or if the processing information is the block partition depth information and the block encoding mode information, a block partition depth of the current block is less than a first block partition depth, and a block encoding mode indicated by block encoding mode information of at least one block of the N related blocks is not the Merge mode, determining the block partition manner of the current block according to a first preset condition, where the first block partition depth is greater than or equal to a maximum value of a block partition depth of the N related blocks.

With reference to the first aspect or the first possible implementation manner of the first aspect or the second possible implementation manner of the first aspect or the third possible implementation manner of the first aspect, in a fourth possible implementation manner, the method further includes:

determining a block partition flag corresponding to the block partition manner of the current block; and if the processing information is the block partition depth information and the block partition depth of the current block is greater than or equal to the first block partition depth, skipping carrying the block partition flag in a bitstream corresponding to the current block, where the first block partition depth is greater than or equal to the maximum value of the block partition depth of the N related blocks;

or if the processing information is the block encoding mode information and the block encoding mode indicated by the block encoding mode information of the N related blocks is the Merge mode, skipping carrying the block partition flag in a bitstream corresponding to the current block;

or if the processing information is the block partition depth information and the block encoding mode information, the block partition depth of the current block is greater than or equal to the first block partition depth, and the block encoding mode indicated by the block encoding mode information of the N related blocks is the Merge mode, skipping carrying the block partition flag in a bitstream corresponding to the current block, where the first block partition depth is greater than or equal to the maximum value of the block partition depth of the N related blocks.

With reference to the first aspect or the first possible implementation manner of the first aspect or the second possible implementation manner of the first aspect or the third possible implementation manner of the first aspect or the fourth possible implementation manner of the first aspect, in a fifth possible implementation manner, the method further includes:

determining a block partition flag corresponding to the block partition manner of the current block; and if the processing information is the block partition depth information and the block partition depth of the current block is less than the first block partition depth, writing the block partition flag into a bitstream corresponding to the current block, where the first block partition depth is greater than or equal to the maximum value of the block partition depth of the N related blocks;

or if the processing information is the block encoding mode information and the block encoding mode indicated by the block encoding mode information of the at least one block of the N related blocks is not the Merge mode, writing the block partition flag into a bitstream corresponding to the current block;

or if the processing information is the block partition depth information and the block encoding mode information, the block partition depth of the current block is less than the first block partition depth, and the block encoding mode indicated by the block encoding mode information of the at least one block of the N related blocks is not the Merge mode, writing the block partition flag into a bitstream corresponding to the current block, where the first block partition depth is greater than or equal to the maximum value of the block partition depth of the N related blocks.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect, in a sixth possible implementation manner, the N related blocks include a reference block of the current block and/or at least one neighboring block of the reference block, the current block belongs to a first texture view, and the reference block and the at least one neighboring block of the reference block belong to a second texture view.

With reference to the sixth possible implementation manner of the first aspect, in a seventh possible implementation manner, the second texture view is a reference view of the first texture view; or the first texture view is a dependent view, and the second texture view is a benchmark view or a dependent view already encoded when the first texture view is encoded, where the first texture view and the second texture view are corresponding to a same moment or different moments.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect, in an eighth possible implementation manner, if the N related blocks include a reference block of the current block and/or at least one neighboring block of the reference block, the current block belongs to a depth map, and the reference block and the at least one neighboring block of the reference block belong to a texture view.

With reference to the eighth possible implementation manner of the first aspect, in a ninth possible implementation manner, the depth map and the texture view are corresponding to a same view or difference views; where the texture view is a texture view already encoded when the depth map is encoded, and the depth map and the texture view are corresponding to a same moment or different moments.

A second aspect of the embodiments of the present invention provides a method for determining a block partition manner in video decoding, where the method may include:

acquiring processing information of N related blocks of a current block; and determining a block partition manner of the current block according to the processing information of the N related blocks; where the processing information is block partition depth information and/or block encoding mode information, where N is a positive integer, and the N related blocks include at least one of the following picture blocks: at least one neighboring block of the current block, a reference block of the current block, and at least one neighboring block of the reference block.

With reference to the second aspect, in a first possible implementation manner, a block encoding mode indicated by the block encoding mode information is a Merge mode or a Skip mode.

With reference to the second aspect or the first possible implementation manner of the second aspect, in a second possible implementation manner, the determining a block partition manner of the current block according to the processing information of the N related blocks includes: when a bitstream corresponding to the current block does not carry a block partition flag corresponding to the current block, determining the block partition manner of the current block according to the processing information of the N related blocks.

With reference to the second possible implementation manner of the second aspect, in a third possible implementation manner, the method further includes: when the bitstream corresponding to the current block carries the block partition flag corresponding to the current block, determining the block partition manner of the current block according to the block partition flag.

With reference to the second aspect or the first possible implementation manner of the second aspect or the second possible implementation manner of the second aspect or the third possible implementation manner of the second aspect, in a fourth possible implementation manner, the determining a block partition manner of the current block according to the processing information of the N related blocks includes: if the processing information is the block partition depth information and a block partition depth of the current block is greater than or equal to a first block partition depth, determining that the block partition manner of the current block is skipping partitioning, where the first block partition depth is greater than or equal to a maximum value of a block partition depth of the N related blocks; or if the processing information is the block encoding mode information and a block encoding mode indicated by block encoding mode information of the N related blocks is the Merge mode, determining that the block partition manner of the current block is skipping partitioning; or if the processing information is the block partition depth information and the block encoding mode information, a block partition depth of the current block is greater than or equal to a first block partition depth, and a block encoding mode indicated by block encoding mode information of the N related blocks is the Merge mode, determining that the block partition manner of the current block is skipping partitioning, where the first block partition depth is greater than or equal to a maximum value of a block partition depth of the N related blocks.

With reference to the second aspect or the first possible implementation manner of the second aspect or the second possible implementation manner of the second aspect or the third possible implementation manner of the second aspect, in a fifth possible implementation manner, the determining a block partition manner of the current block according to the processing information of the N related blocks includes:

if the processing information is the block partition depth information and a block partition depth of the current block is less than a first block partition depth, determining the block partition manner of the current block according to a first preset condition, where the first block partition depth is greater than or equal to a maximum value of a block partition depth of the N related blocks;

or if the processing information is the block encoding mode information and a block encoding mode indicated by block encoding mode information of at least one block of the N related blocks is not the Merge mode, determining the block partition manner of the current block according to a first preset condition;

or if the processing information is the block partition depth information and the block encoding mode information, a block partition depth of the current block is less than a first block partition depth, and a block encoding mode indicated by block encoding mode information of at least one block of the N related blocks is not the Merge mode, determining the block partition manner of the current block according to a first preset condition, where the first block partition depth is greater than or equal to a maximum value of a block partition depth of the N related blocks.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect, in a sixth possible implementation manner, if the N related blocks include a reference block of the current block and/or at least one neighboring block of the reference block, the current block belongs to a first texture view, and the reference block and the at least one neighboring block of the reference block belong to a second texture view.

With reference to the sixth possible implementation manner of the second aspect, in a seventh possible implementation manner, the second texture view is a reference view of the first texture view; or the first texture view is a dependent view, and the second texture view is a benchmark view or a dependent view already decoded when the first texture view is decoded, where the first texture view and the second texture view are corresponding to a same moment or different moments.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect, in an eighth possible implementation manner, if the N related blocks include a reference block of the current block and/or at least one neighboring block of the reference block, the current block belongs to a depth map, and the reference block and the at least one neighboring block of the reference block belong to a texture view.

With reference to the eighth possible implementation manner of the second aspect, in a ninth possible implementation manner, the depth map and the texture view are corresponding to a same view or difference views; where the texture view is a texture view already decoded when the depth map is decoded, and the depth map and the texture view are corresponding to a same moment or different moments.

A third aspect of the embodiments of the present invention provides a video encoder, including:

an acquiring unit, configured to acquire processing information of N related blocks of a current block; and a determining unit, configured to determine a block partition manner of the current block according to the processing information of the N related blocks; where the processing information is block partition depth information and/or block encoding mode information, N is a positive integer, and the N related blocks include at least one of the following picture blocks: at least one neighboring block of the current block, a reference block of the current block, and at least one neighboring block of the reference block.

With reference to the third aspect, in a first possible implementation manner, a block encoding mode indicated by the block encoding mode information acquired by the acquiring unit is a Merge mode or a Skip mode.

With reference to the third aspect or the first possible implementation manner of the third aspect, in a second possible implementation manner, the determining unit is specifically configured to: if the processing information is the block partition depth information and a block partition depth of the current block is greater than or equal to a first block partition depth, determine that the block partition manner of the current block is skipping partitioning, where the first block partition depth is greater than or equal to a maximum value of a block partition depth of the N related blocks; or if the processing information is the block encoding mode information and a block encoding mode indicated by block encoding mode information of the N related blocks is the Merge mode, determine that the block partition manner of the current block is skipping partitioning;

or if the processing information is the block partition depth information and the block encoding mode information, a block partition depth of the current block is greater than or equal to a first block partition depth, and a block encoding mode indicated by block encoding mode information of the N related blocks is the Merge mode, determine that the block partition manner of the current block is skipping partitioning, where the first block partition depth is greater than or equal to a maximum value of a block partition depth of the N related blocks.

With reference to the third aspect or the first possible implementation manner of the third aspect or the second possible implementation manner of the third aspect, in a third possible implementation manner, the determining unit is specifically configured to: if the processing information is the block partition depth information and a block partition depth of the current block is less than a first block partition depth, determine the block partition manner of the current block according to a first preset condition, where the first block partition depth is greater than or equal to a maximum value of a block partition depth of the N related blocks;

or if the processing information is the block encoding mode information and a block encoding mode indicated by block encoding mode information of at least one block of the N related blocks is not the Merge mode, determine the block partition manner of the current block according to a first preset condition;

or if the processing information is the block partition depth information and the block encoding mode information, a block partition depth of the current block is less than a first block partition depth, and a block encoding mode indicated by block encoding mode information of at least one block of the N related blocks is not the Merge mode, determine the block partition manner of the current block according to a first preset condition, where the first block partition depth is greater than or equal to a maximum value of a block partition depth of the N related blocks.

With reference to the third aspect or the first possible implementation manner of the third aspect or the second possible implementation manner of the third aspect or the third possible implementation manner of the third aspect, in a fourth possible implementation manner, the video encoder further includes:

a processing unit, configured to: determine a block partition flag corresponding to the block partition manner of the current block; and if the processing information is the block partition depth information and the block partition depth of the current block is greater than or equal to the first block partition depth, skip carrying the block partition flag in a bitstream corresponding to the current block, where the first block partition depth is greater than or equal to the maximum value of the block partition depth of the N related blocks;

or if the processing information is the block encoding mode information and the block encoding mode indicated by the block encoding mode information of the N related blocks is the Merge mode, skip carrying the block partition flag in a bitstream corresponding to the current block;

or if the processing information is the block partition depth information and the block encoding mode information, the block partition depth of the current block is greater than or equal to the first block partition depth, and the block encoding mode indicated by the block encoding mode information of the N related blocks is the Merge mode, skip carrying the block partition flag in a bitstream corresponding to the current block, where the first block partition depth is greater than or equal to the maximum value of the block partition depth of the N related blocks.

With reference to the fourth possible implementation manner of the third aspect, in a fifth possible implementation manner, the processing unit is further configured to: if the processing information is the block partition depth information and the block partition depth of the current block is less than the first block partition depth, write the block partition flag into the bitstream corresponding to the current block, where the first block partition depth is greater than or equal to the maximum value of the block partition depth of the N related blocks;

or if the processing information is the block encoding mode information and the block encoding mode indicated by the block encoding mode information of the at least one block of the N related blocks is not the Merge mode, write the block partition flag into the bitstream corresponding to the current block;

or if the processing information is the block partition depth information and the block encoding mode information, the block partition depth of the current block is less than the first block partition depth, and the block encoding mode indicated by the block encoding mode information of the at least one block of the N related blocks is not the Merge mode, write the block partition flag into the bitstream corresponding to the current block, where the first block partition depth is greater than or equal to the maximum value of the block partition depth of the N related blocks.

A fourth aspect of the present invention provides a video decoder, where the video decoder may include:

an acquiring unit, configured to acquire processing information of N related blocks of a current block; and a determining unit, configured to determine a block partition manner of the current block according to the processing information of the N related blocks; where the processing information is block partition depth information and/or block encoding mode information, N is a positive integer, and the N related blocks include at least one of the following picture blocks: at least one neighboring block of the current block, a reference block of the current block, and at least one neighboring block of the reference block.

With reference to the fourth aspect, in a first possible implementation manner, a block encoding mode indicated by the block encoding mode information acquired by the acquiring unit is a Merge mode or a Skip mode.

With reference to the fourth aspect or the first possible implementation manner of the fourth aspect, in a second possible implementation manner, the determining unit is specifically configured to: when a bitstream corresponding to the current block does not carry a block partition flag corresponding to the current block, determine the block partition manner of the current block according to the processing information of the N related blocks.

With reference to the second possible implementation manner of the fourth aspect, in a third possible implementation manner, the video decoder further includes a second determining unit, configured to: when the bitstream corresponding to the current block carries the block partition flag corresponding to the current block, determine the block partition manner of the current block according to the block partition flag.

With reference to the fourth aspect or the first possible implementation manner of the fourth aspect or the second possible implementation manner of the fourth aspect or the third possible implementation manner of the fourth aspect, in a fourth possible implementation manner, in an aspect of the determining a block partition manner of the current block according to the processing information of the N related blocks, the determining unit is specifically configured to: if the processing information is the block partition depth information and a block partition depth of the current block is greater than or equal to a first block partition depth, determine that the block partition manner of the current block is skipping partitioning, where the first block partition depth is greater than or equal to a maximum value of a block partition depth of the N related blocks; or if the processing information is the block encoding mode information and a block encoding mode indicated by block encoding mode information of the N related blocks is the Merge mode, determine that the block partition manner of the current block is skipping partitioning;

or if the processing information is the block partition depth information and the block encoding mode information, a block partition depth of the current block is greater than or equal to a first block partition depth, and a block encoding mode indicated by block encoding mode information of the N related blocks is the Merge mode, determine that the block partition manner of the current block is skipping partitioning, where the first block partition depth is greater than or equal to a maximum value of a block partition depth of the N related blocks.

With reference to the fourth aspect or the first possible implementation manner of the fourth aspect or the second possible implementation manner of the fourth aspect or the third possible implementation manner of the fourth aspect, in a fifth possible implementation manner, in an aspect of the determining a block partition manner of the current block according to the processing information of the N related blocks, the determining unit is specifically configured to: if the processing information is the block partition depth information and a block partition depth of the current block is less than a first block partition depth, determine the block partition manner of the current block according to a first preset condition, where the first block partition depth is greater than or equal to a maximum value of a block partition depth of the N related blocks;

or if the processing information is the block encoding mode information and a block encoding mode indicated by block encoding mode information of at least one block of the N related blocks is not the Merge mode, determine the block partition manner of the current block according to a first preset condition;

or if the processing information is the block partition depth information and the block encoding mode information, a block partition depth of the current block is less than a first block partition depth, and a block encoding mode indicated by block encoding mode information of at least one block of the N related blocks is not the Merge mode, determine the block partition manner of the current block according to a first preset condition, where the first block partition depth is greater than or equal to a maximum value of a block partition depth of the N related blocks.

It may be learned that, in some embodiments of the present invention, an encoder side acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the encoder side may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video encoding process.

In some other embodiments of the present invention, a decoder side acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the decoder side may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video decoding process.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1-*a* is a schematic flowchart of a method for determining a block partition manner in video encoding according to an embodiment of the present invention;

FIG. 1-*b* is a schematic diagram of a position relationship between a current block and N related blocks according to an embodiment of the present invention;

FIG. 2 is a schematic flowchart of a method for determining a block partition manner in video decoding according to an embodiment of the present invention;

FIG. 7-*a* and FIG. 7-*b* are schematic diagrams of two video encoders according to an embodiment of the present invention;

FIG. 8-*a* and FIG. 8-*b* are schematic diagrams of two video decoders according to an embodiment of the present invention;

FIG. 9 is a schematic diagram of a video encoding device according to an embodiment of the present invention;

FIG. 10 is a schematic diagram of a video decoding device according to an embodiment of the present invention;

DETAILED DESCRIPTION

Figure 3:
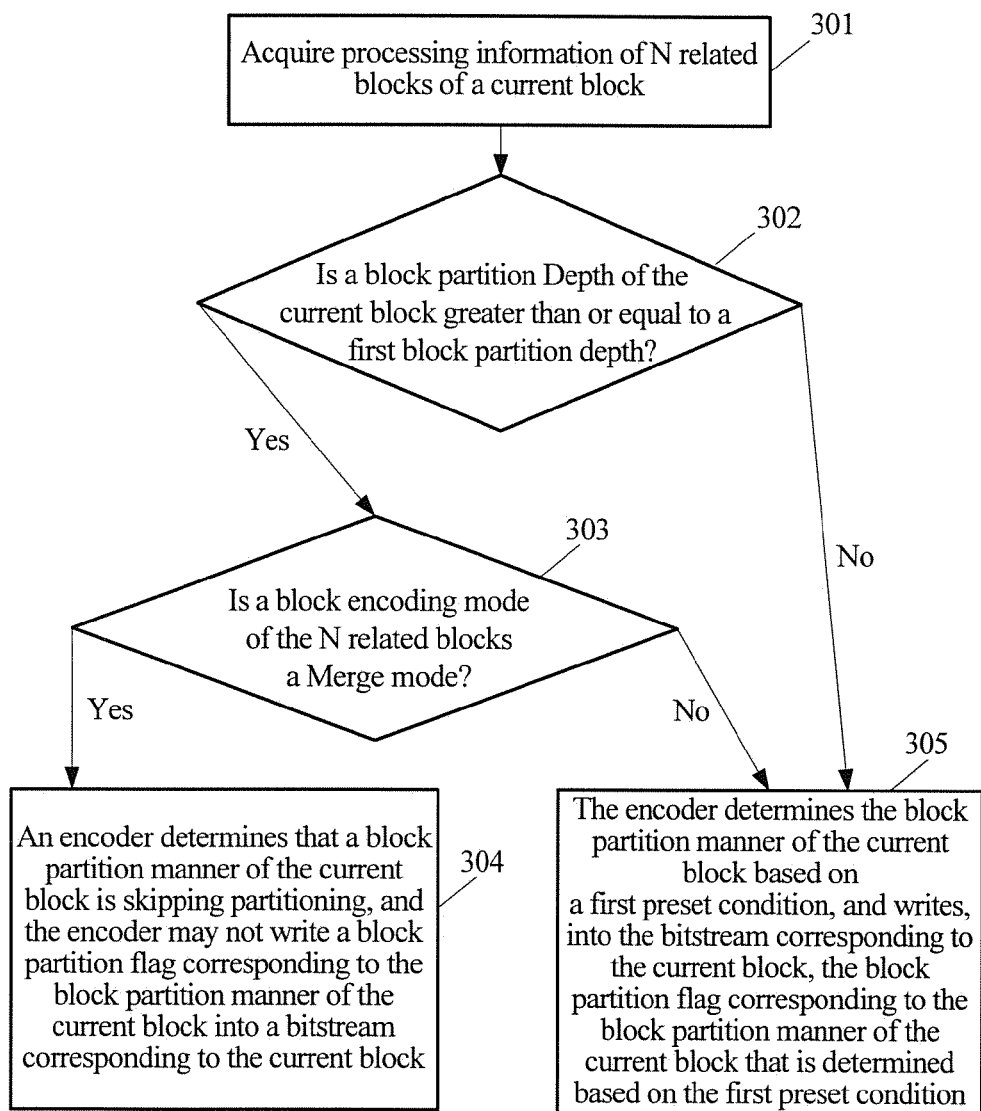
FIG. 3 is a schematic flowchart of another method for determining a block partition manner in video encoding according to an embodiment of the present invention.

Embodiments of the present invention provide a method for determining a block partition manner in video encoding, a method for determining a block partition manner in video decoding, and a related apparatus, so as to reduce computational complexity in determining a block partition manner of a current block in a video encoding/decoding process.

To make a person skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

The following separately provides descriptions in detail.

In the specification, claims, and accompanying drawings of the present invention, the terms "first", "second", "third", "fourth", and so on (if any) are intended to differentiate similar objects, and are not necessarily used to describe a specific order or sequence. It should be understood that the data used in this way are interchangeable in proper circumstances so that the embodiments of the present invention described herein can, for example, be implemented in a sequence except that shown or described herein. In addition, the terms "include", "have" and any variants of them are intended to mean non-exclusive including. For example, including a process, a method, a system, a product, or a device of a series of steps or units is not necessarily limited to the steps or units that are clearly listed, but may also include another step or unit that is not clearly listed or inherent to these processes, methods, products, or devices.

In an embodiment of a method for determining a block partition manner in video encoding according to the present invention, the method for determining a block partition manner in video encoding may include: acquiring processing information of N related blocks of a current block; and determining a block partition manner of the current block according to the processing information of the N related blocks; where the processing information is block partition depth information and/or block encoding mode information, N is a positive integer, and the N related blocks include at least one of the following picture blocks: at least one neighboring block of the current block, a reference block of the current block, and at least one neighboring block of the reference block.

Referring to FIG. 1-a, FIG. 1-a is a schematic flowchart of a method for determining a block partition manner in video encoding according to an embodiment of the present invention. As shown in FIG. 1-a, the method for determining a block partition manner in video encoding according to this embodiment of the present invention may include the following content:

101. Acquire processing information of N related blocks of a current block.

The processing information is block partition depth information and/or block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

For example, as shown in FIG. 1-b, N related blocks of a current block a may be at least one block of the following picture blocks: a picture block a1, a picture block a2, a picture block a3, a picture block a4, a picture block b, a picture block b1, a picture block b2, a picture block b3, and a picture block b4, where the picture block a1, the picture block a2, the picture block a3, and the picture block a4 are neighboring blocks of the current block a, the picture block b is a reference block of the current block a, and the picture block b1, the picture block b2, the picture block b3, and the picture block b4 are reference blocks of the picture block b.

102. Determine a block partition manner of the current block according to the processing information of the N related blocks.

The determining a block partition manner of the current block may specifically be determining not to partition the current block or determining to partition the current block, that is, determining whether to partition the current block according to the processing information of the N related blocks.

In some embodiments of the present invention, a block encoding mode indicated by the block encoding mode information may be a Merge mode or a Skip mode or another block encoding mode.

The processing information of the N related blocks is block partition depth information and/or block encoding mode information of the N related blocks. Therefore, the block partition manner of the current block may be determined based on multiple manners according to the processing information of the N related blocks.

For example, the determining a block partition manner of the current block according to the processing information of the N related blocks may include: if the processing information is the block partition depth information and a block partition depth of the current block is greater than or equal to a first block partition depth, determining that the block partition manner of the current block is skipping partitioning, where the first block partition depth is greater than or equal to a maximum value of a block partition depth of the N related blocks; or, if the processing information is the block encoding mode information and a block encoding mode indicated by block encoding mode information of the N related blocks is the Merge mode, determining that the block partition manner of the current block is skipping partitioning; or, if the processing information is the block partition depth information and the block encoding mode information, a block partition depth of the current block is greater than or equal to a first block partition depth, and a block encoding mode indicated by block encoding mode information of the N related blocks is the Merge mode, determining that the block partition manner of the current block is skipping partitioning, where the first block partition depth is greater than or equal to a maximum value of a block partition depth of the N related blocks. It is found, through tests, that the foregoing example of determining the block partition manner of the current block features simple computation and higher reliability, and has a relatively high implementation value.

For another example, the determining a block partition manner of the current block according to the processing information of the N related blocks may include that: if the processing information is the block partition depth information and a block partition depth of the current block is less than a first block partition depth, it may be determined that the block partition manner of the current block is partitioning, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, it may be determined that the block partition manner of the current block is partitioning; or, if the processing information is the block partition depth information and the block encoding mode information, a block partition depth of the current block is less than a first block partition depth, and a block encoding mode indicated by block encoding mode information of at least one block of the N related blocks is not the Merge mode, it may be determined that the block partition manner of the current block is partitioning, where the first block partition depth is greater than or equal to a maximum value of a block partition depth of the N related blocks.

For another example, the determining a block partition manner of the current block according to the processing information of the N related blocks may include that: if the processing information is the block partition depth information and a block partition depth of the current block is less than a first block partition depth, the block partition manner of the current block may be determined according to a first preset condition, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, the block partition manner of the current block may be determined according to a first preset condition; or, if the processing information is the block partition depth information and the block encoding mode information, a block partition depth of the current block is less than a first block partition depth, and a block encoding mode indicated by block encoding mode information of at least one block of the N related blocks is not the Merge mode, the block partition manner of the current block may be determined according to a first preset condition, where the first block partition depth is greater than or equal to a maximum value of a block partition depth of the N related blocks.

There may be various specific implementation manners of determining the block partition manner of the current block according to the first preset condition. For example, the determining the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, the method may further include: determining a block partition flag corresponding to the block partition manner of the current block; and if the processing information is the block partition depth information and the block partition depth of the current block is greater than or equal to the first block partition depth, skipping carrying the block partition flag in a bitstream corresponding to the current block, where the first block partition depth is greater than or equal to the maximum value of the block partition depth of the N related blocks; or, if the processing information is the block encoding mode information and the block encoding mode indicated by the block encoding mode information of the N related blocks is the Merge mode, skipping carrying the block partition flag in a bitstream corresponding to the current block; or, if the processing information is the block partition depth information and the block encoding mode information, the block partition depth of the current block is greater than or equal to the first block partition depth, and the block encoding mode indicated by the block encoding mode information of the N related blocks is the Merge mode, skipping carrying the block partition flag in a bitstream corresponding to the current block, where the first block partition depth is greater than or equal to the maximum value of the block partition depth of the N related blocks.

In some embodiments of the present invention, the method may further include: determining a block partition flag corresponding to the block partition manner of the current block; and if the processing information is the block partition depth information and the block partition depth of the current block is less than the first block partition depth, writing the block partition flag into a bitstream corresponding to the current block, where the first block partition depth is greater than or equal to the maximum value of the block partition depth of the N related blocks; or, if the processing information is the block encoding mode information and the block encoding mode indicated by the block encoding mode information of the at least one block of the N related blocks is not the Merge mode, writing the block partition flag into a bitstream corresponding to the current block; or, if the processing information is the block partition depth information and the block encoding mode information, the block partition depth of the current block is less than the first block partition depth, and the block encoding mode indicated by the block encoding mode information of the at least one block of the N related blocks is not the Merge mode, writing the block partition flag into a bitstream corresponding to the current block, where the first block partition depth is greater than or equal to the maximum value of the block partition depth of the N related blocks, and the block partition flag corresponding to the block partition manner of the current block indicates whether to partition the current block, where the block partition manner of the current block may be determined according to the first preset condition.

It may be understood that, because in some scenarios, an encoder may not write the block partition flag corresponding to the current block into the bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

By using an example that the current block is a CU, in the HEVC standard, the CU is generally further partitioned in a quadtree partition manner. For example, when an upper-level CU is partitioned into sub-CUs (Sub-CU), a block partition flag (split_flag) is used to indicate whether to further partition a current Sub-CU downward into smaller Sub-CUs. For example, if a value of the split_flag is "1", it indicates that the current Sub-CU is further partitioned downward into smaller Sub-CUs; if a value of the split_flag is "0", it indicates that partition of the current Sub-CU ends. Certainly, other values may also be used for the split_flag to indicate the block partition manner of the current block.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already encoded when the first texture view is encoded, where the first texture view and the second texture view are corresponding to a same moment or different moments.

In some other embodiments of the present invention, if the N related blocks include a reference block of the current block and/or at least one neighboring block of the reference block, the current block belongs to a depth map, and the reference block and/or the at least one neighboring block of the reference block belong to a texture view. For example, the depth map and the texture view are corresponding to a same view or difference views; where the texture view is a texture view already encoded when the depth map is encoded, and the depth map and the texture view are corresponding to a same moment or different moments.

It may be learned that, an encoder side according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the encoder side may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video encoding process.

Further, because in some scenarios, the encoder side may not write a block partition flag corresponding to the current block into a bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

In an embodiment of a method for determining a block partition manner in video decoding according to the present invention, the method for determining a block partition manner in video decoding may include: acquiring processing information of N related blocks of a current block; and determining a block partition manner of the current block according to the processing information of the N related blocks; where the N related blocks include at least one neighboring block of the current block, a reference block of the current block, and/or at least one neighboring block of the reference block, the processing information is block partition depth information and/or block encoding mode information, and N is a positive integer.

Referring to FIG. 2, FIG. 2 is a schematic flowchart of a method for determining a block partition manner in video decoding according to an embodiment of the present invention. As shown in FIG. 2, the method for determining a block partition manner in video decoding according to this embodiment of the present invention may include the following content:

201. Acquire processing information of N related blocks of a current block.

The processing information is block partition depth information and/or block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

202. Determine a block partition manner of the current block according to the processing information of the N related blocks.

The determining a block partition manner of the current block may specifically be determining not to partition the current block or determining to partition the current block, that is, determining whether to partition the current block according to the processing information of the N related blocks.

In some embodiments of the present invention, a block encoding mode indicated by the block encoding mode information may be a Merge mode or a Skip mode or another block encoding mode.

The processing information of the N related blocks is block partition depth information and/or block encoding mode information of the N related blocks. Therefore, the block partition manner of the current block may be determined based on multiple manners according to the processing information of the N related blocks.

In some embodiments of the present invention, the determining a block partition manner of the current block according to the processing information of the N related blocks may include: when a bitstream corresponding to the current block does not carry a block partition flag corresponding to the current block, determining the block partition manner of the current block according to the processing information of the N related blocks. Further, when the bitstream corresponding to the current block carries the block partition flag corresponding to the current block, the block partition manner of the current block may also be determined, for example, according to the block partition flag. Alternatively, when the bitstream corresponding to the current block carries the block partition flag corresponding to the current block, the block partition manner of the current block may also be determined, for example, according to the processing information of the N related blocks.

It may be understood that, because in some scenarios, an encoder may not write the block partition flag corresponding to the current block into the bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

For example, the determining a block partition manner of the current block according to the processing information of the N related blocks may include: if the processing information is the block partition depth information and a block partition depth of the current block is greater than or equal to a first block partition depth, determining that the block partition manner of the current block is skipping partitioning, where the first block partition depth is greater than or equal to a maximum value of a block partition depth of the N related blocks; or, if the processing information is the block encoding mode information and a block encoding mode indicated by block encoding mode information of the N related blocks is the Merge mode, determining that the block partition manner of the current block is skipping partitioning; or, if the processing information is the block partition depth information and the block encoding mode information, a block partition depth of the current block is greater than or equal to a first block partition depth, and a block encoding mode indicated by block encoding mode information of the N related blocks is the Merge mode, determining that the block partition manner of the current block is skipping partitioning, where the first block partition depth is greater than or equal to a maximum value of a block partition depth of the N related blocks. It is found, through tests, that the foregoing several exemplary mechanisms of determining the block partition manner of the current block feature simple computation and higher reliability, and have a relatively high implementation value.

For another example, the determining a block partition manner of the current block according to the processing information of the N related blocks may include that: if the processing information is the block partition depth information and a block partition depth of the current block is less than a first block partition depth, it may be determined that the block partition manner of the current block is partitioning, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, it may be determined that the block partition manner of the current block is partitioning; or, if the processing information is the block partition depth information and the block encoding mode information, a block partition depth of the current block is less than a first block partition depth, and a block encoding mode indicated by block encoding mode information of at least one block of the N related blocks is not the Merge mode, it may be determined that the block partition manner of the current block is partitioning, where the first block partition depth is greater than or equal to a maximum value of a block partition depth of the N related blocks.

For another example, the determining a block partition manner of the current block according to the processing information of the N related blocks may include that: if the processing information is the block partition depth information and a block partition depth of the current block is less than a first block partition depth, the block partition manner of the current block may be determined according to a first preset condition, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, the block partition manner of the current block may be determined according to a first preset condition; or, if the processing information is the block partition depth information and the block encoding mode information, a block partition depth of the current block is less than a first block partition depth, and a block encoding mode indicated by block encoding mode information of at least one block of the N related blocks is not the Merge mode, the block partition manner of the current block may be determined according to a first preset condition, where the first block partition depth is greater than or equal to a maximum value of a block partition depth of the N related blocks.

There may be various specific implementation manners of determining the block partition manner of the current block according to the first preset condition. For example, the determining the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already decoded when the first texture view is decoded, where the first texture view and the second texture view are corresponding to a same moment or different moments. It may be understood that, the foregoing scenario may be corresponding to multi-view video decoding.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already decoded when the depth map is decoded, and the depth map and the texture view are corresponding to a same moment or different moments. It may be understood that, the foregoing scenario may be corresponding to multi-view video decoding with a depth map.

It may be learned that, a decoder side according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the decoder side may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video decoding process.

Further, because the decoder side may determine the block partition manner of the current block based on set logic, in some scenarios, an encoder side may not write a block partition flag corresponding to the current block into a bitstream corresponding to the current block. Therefore, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

To help better understand and implement the solutions of the embodiments of the present invention, the following uses some specific application scenarios as examples for description.

Referring to FIG. 3, FIG. 3 is a schematic flowchart of another method for determining a block partition manner in video encoding according to an embodiment of the present invention. As shown in FIG. 3, the another method for determining a block partition manner in video encoding according to this embodiment of the present invention may include the following content:

301. An encoder acquires processing information of N related blocks of a current block.

The processing information is block partition depth information and/or block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

In some embodiments of the present invention, a block encoding mode indicated by the block encoding mode information may be a Merge mode or a Skip mode or another block encoding mode.

302. The encoder determines whether a block partition depth of the current block is greater than or equal to a first block partition depth.

If the block partition depth of the current block is greater than or equal to the first block partition depth, step 303 is performed.

If the block partition depth of the current block is less than the first block partition depth, step 305 is performed.

The first block partition depth may be greater than or equal to a maximum value of a block partition depth of the N related blocks.

303. The encoder determines whether a block encoding mode indicated by block encoding mode information of the N related blocks is a Merge mode.

If the block encoding mode indicated by the block encoding mode information of the N related blocks is the Merge mode, step 304 is performed.

If a block encoding mode indicated by block encoding mode information of at least one block of the N related blocks is not the Merge mode, step 305 is performed.

304. The encoder determines that a block partition manner of the current block is skipping partitioning, and the encoder may not write a block partition flag corresponding to the block partition manner of the current block into a bitstream corresponding to the current block.

305. The encoder determines the block partition manner of the current block based on a first preset condition, and writes, into the bitstream corresponding to the current block, the block partition flag corresponding to the block partition manner of the current block that is determined based on the first preset condition.

There may be various specific implementation manners of determining the block partition manner of the current block according to the first preset condition. For example, the determining the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already encoded when the first texture view is encoded, where the first texture view and the second texture view are corresponding to a same moment or different moments. It may be understood that, the foregoing scenario may be corresponding to multi-view video encoding.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already encoded when the depth map is encoded, and the depth map and the texture view are corresponding to a same moment or different moments. It may be understood that, the foregoing scenario may be corresponding to multi-view video encoding with a depth map.

It may be learned that, an encoder side according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the encoder side may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video encoding process.

Further, because in some scenarios, the encoder side may not write a block partition flag corresponding to the current block into a bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

Figure 4:
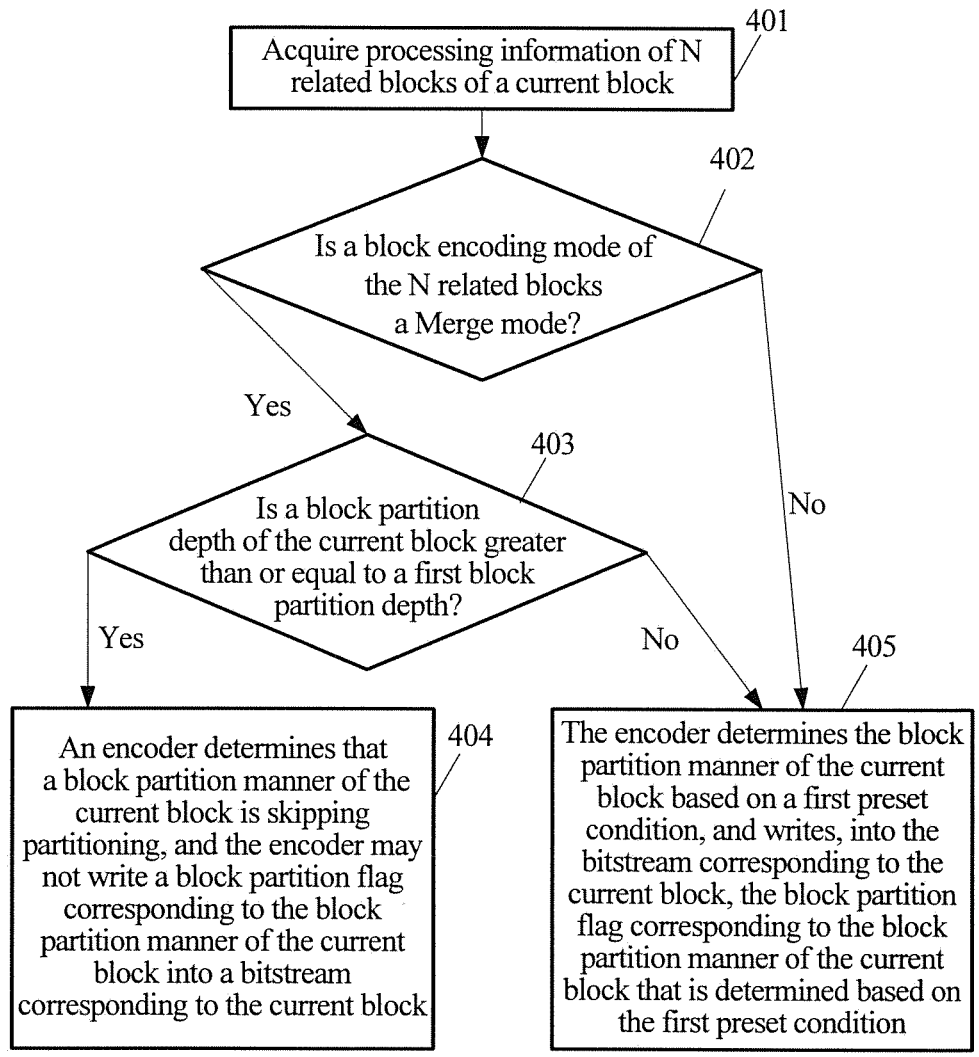
FIG. 4 is a schematic flowchart of still another method for determining a block partition manner in video encoding according to an embodiment of the present invention.

Referring to FIG. 4, FIG. 4 is a schematic flowchart of still another method for determining a block partition manner in video encoding according to an embodiment of the present invention. As shown in FIG. 4, the still another method for determining a block partition manner in video encoding according to this embodiment of the present invention may include the following content:

401. An encoder acquires processing information of N related blocks of a current block.

The processing information is block partition depth information and/or block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

In some embodiments of the present invention, a block encoding mode indicated by the block encoding mode information may be a Merge mode or a Skip mode or another block encoding mode.

402. The encoder determines whether a block encoding mode indicated by block encoding mode information of the N related blocks is a Merge mode.

If the block encoding mode indicated by the block encoding mode information of the N related blocks is the Merge mode, step 403 is performed.

If a block encoding mode indicated by block encoding mode information of at least one block of the N related blocks is not the Merge mode, step 405 is performed.

403. The encoder determines whether a block partition depth of the current block is greater than or equal to a first block partition depth.

If the block partition depth of the current block is greater than or equal to the first block partition depth, step 404 is performed.

If the block partition depth of the current block is less than the first block partition depth, step 405 is performed.

The first block partition depth may be greater than or equal to a maximum value of a block partition depth of the N related blocks.

404. The encoder determines that a block partition manner of the current block is skipping partitioning, and the encoder may not write a block partition flag corresponding to the block partition manner of the current block into a bitstream corresponding to the current block.

405. The encoder determines the block partition manner of the current block based on a first preset condition, and writes, into the bitstream corresponding to the current block, the block partition flag corresponding to the block partition manner of the current block that is determined based on the first preset condition.

There may be various specific implementation manners of determining the block partition manner of the current block according to the first preset condition. For example, the determining the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already encoded when the first texture view is encoded, where the first texture view and the second texture view are corresponding to a same moment or different moments. It may be understood that, the foregoing scenario may be corresponding to multi-view video encoding.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already encoded when the depth map is encoded, and the depth map and the texture view are corresponding to a same moment or different moments. It may be understood that, the foregoing scenario may be corresponding to multi-view video encoding with a depth map.

It may be learned that, an encoder side according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the encoder side may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video encoding process.

Further, because in some scenarios, the encoder side may not write a block partition flag corresponding to the current block into a bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

Figure 5:
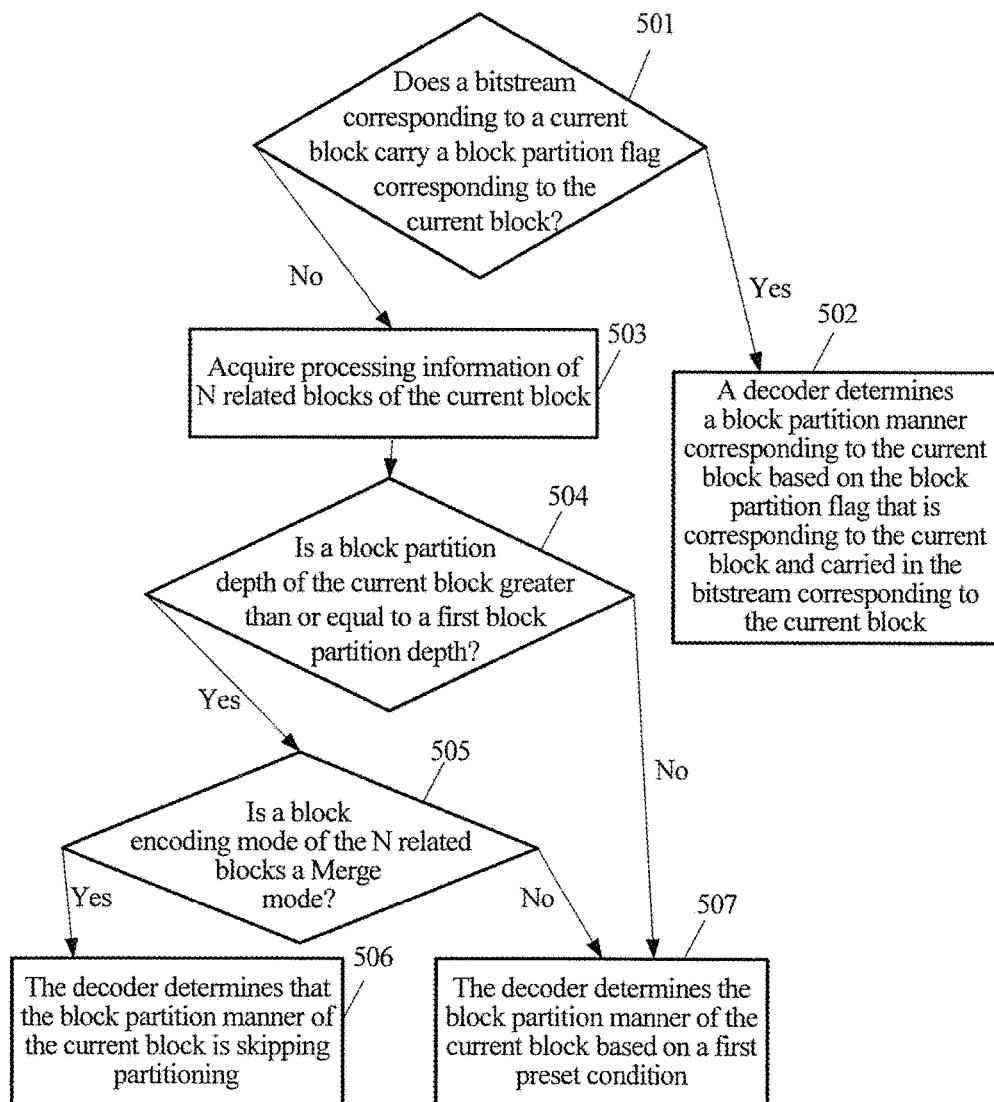
FIG. 5 is a schematic flowchart of another method for determining a block partition manner in video decoding according to an embodiment of the present invention.

Referring to FIG. 5, FIG. 5 is a schematic flowchart of another method for determining a block partition manner in video decoding according to an embodiment of the present invention. As shown in FIG. 5, the another method for determining a block partition manner in video decoding according to this embodiment of the present invention may include the following content:

501. A decoder determines, by parsing a bitstream corresponding to a current block, whether the bitstream corresponding to the current block carries a block partition flag corresponding to the current block.

If the bitstream corresponding to the current block carries the block partition flag corresponding to the current block, step 502 is performed.

If the bitstream corresponding to the current block does not carry the block partition flag corresponding to the current block, step 503 is performed.

502. The decoder determines a block partition manner corresponding to the current block based on the block partition flag that is corresponding to the current block and carried in the bitstream corresponding to the current block.

503. Acquire processing information of N related blocks of the current block.

The processing information is block partition depth information and/or block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

In some embodiments of the present invention, a block encoding mode indicated by the block encoding mode information may be a Merge mode or a Skip mode or another block encoding mode.

504. The decoder determines whether a block partition depth of the current block is greater than or equal to a first block partition depth.

If the block partition depth of the current block is greater than or equal to the first block partition depth, step 505 is performed.

If the block partition depth of the current block is less than the first block partition depth, step 507 is performed.

The first block partition depth may be greater than or equal to a maximum value of a block partition depth of the N related blocks.

505. The decoder determines whether a block encoding mode indicated by block encoding mode information of the N related blocks is a Merge mode.

If the block encoding mode indicated by the block encoding mode information of the N related blocks is the Merge mode, step 506 is performed.

If a block encoding mode indicated by block encoding mode information of at least one block of the N related blocks is not the Merge mode, step 507 is performed.

506. The decoder determines that the block partition manner of the current block is skipping partitioning.

507. The decoder determines the block partition manner of the current block based on a first preset condition.

There may be various specific implementation manners of determining the block partition manner of the current block according to the first preset condition. For example, the determining the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already decoded when the first texture view is decoded, where the first texture view and the second texture view are corresponding to a same moment or different moments. It may be understood that, the foregoing scenario may be corresponding to multi-view video decoding.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already decoded when the depth map is decoded, and the depth map and the texture view are corresponding to a same moment or different moments. It may be understood that, the foregoing scenario may be corresponding to multi-view video decoding with a depth map.

It may be learned that, a decoder side according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and block encoding mode information. Because the decoder side may determine the block partition manner of the current block according to the processing information (that is, the block partition depth information, the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video decoding process.

Further, because the decoder side may determine the block partition manner of the current block based on set logic, in some scenarios, an encoder side may not write a block partition flag corresponding to the current block into a bitstream corresponding to the current block. Therefore, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

Figure 6:
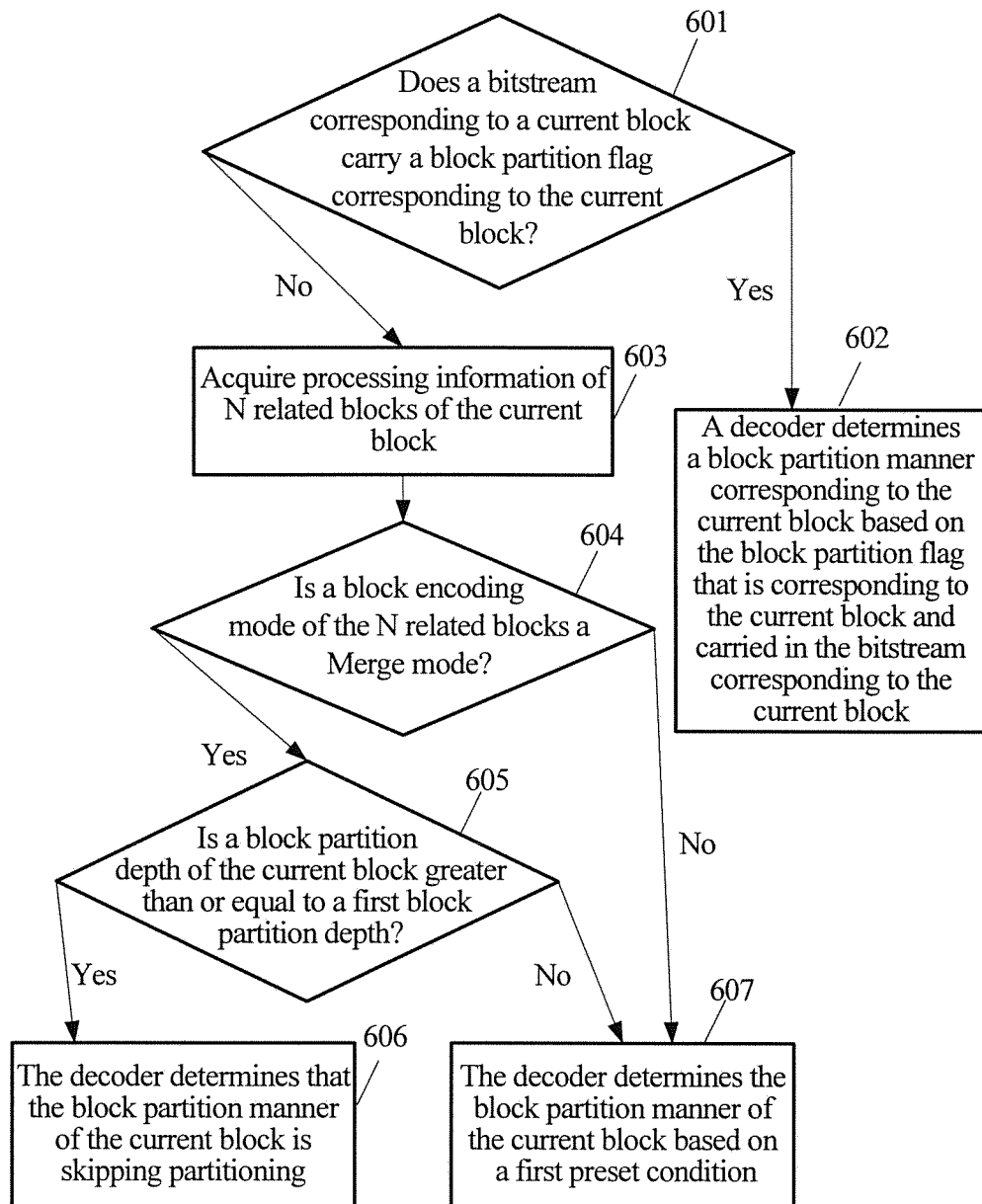
FIG. 6 is a schematic flowchart of still another method for determining a block partition manner in video decoding according to an embodiment of the present invention.

Referring to FIG. 6, FIG. 6 is a schematic flowchart of still another method for determining a block partition manner in video decoding according to an embodiment of the present invention. As shown in FIG. 6, the still another method for determining a block partition manner in video decoding according to this embodiment of the present invention may include the following content:

601. A decoder determines, by parsing a bitstream corresponding to a current block, whether the bitstream corresponding to the current block carries a block partition flag corresponding to the current block.

If the bitstream corresponding to the current block carries the block partition flag corresponding to the current block, step 602 is performed.

If the bitstream corresponding to the current block does not carry the block partition flag corresponding to the current block, step 603 is performed.

602. The decoder determines a block partition manner corresponding to the current block based on the block partition flag that is corresponding to the current block and carried in the bitstream corresponding to the current block.

603. Acquire processing information of N related blocks of the current block.

The processing information is block partition depth information and/or block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

In some embodiments of the present invention, a block encoding mode indicated by the block encoding mode information may be a Merge mode or a Skip mode or another block encoding mode.

604. The decoder determines whether a block encoding mode indicated by block encoding mode information of the N related blocks is a Merge mode.

If the block encoding mode indicated by the block encoding mode information of the N related blocks is the Merge mode, step 605 is performed.

If a block encoding mode indicated by block encoding mode information of at least one block of the N related blocks is not the Merge mode, step 607 is performed.

605. The decoder determines whether a block partition depth of the current block is greater than or equal to a first block partition depth.

If the block partition depth of the current block is greater than or equal to the first block partition depth, step 606 is performed.

If the block partition depth of the current block is less than the first block partition depth, step 607 is performed.

The first block partition depth may be greater than or equal to a maximum value of a block partition depth of the N related blocks.

606. The decoder determines that the block partition manner of the current block is skipping partitioning.

607. The decoder determines the block partition manner of the current block based on a first preset condition.

There may be various specific implementation manners of determining the block partition manner of the current block according to the first preset condition. For example, the determining the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already decoded when the first texture view is decoded, where the first texture view and the second texture view are corresponding to a same moment or different moments. It may be understood that, the foregoing scenario may be corresponding to multi-view video decoding.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already decoded when the depth map is decoded, and the depth map and the texture view are corresponding to a same moment or different moments. It may be understood that, the foregoing scenario may be corresponding to multi-view video decoding with a depth map.

It may be learned that, a decoder side according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and block encoding mode information. Because the decoder side may determine the block partition manner of the current block according to the processing information (that is, the block partition depth information, the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video decoding process.

Further, because the decoder side may determine the block partition manner of the current block based on set logic, in some scenarios, an encoder side may not write a block partition flag corresponding to the current block into a bitstream corresponding to the current block. Therefore, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

The following further provides related apparatuses configured to implement the solutions.

Referring to FIG. 7, an embodiment of the present invention provides a video encoder 700, which may include:

an acquiring unit 710 and a determining unit 720.

The acquiring unit 710 is configured to acquire processing information of N related blocks of a current block.

The determining unit 720 is configured to determine a block partition manner of the current block according to the processing information of the N related blocks; where the N related blocks include at least one neighboring block of the current block, a reference block of the current block, and/or at least one neighboring block of the reference block, the processing information is block partition depth information and/or block encoding mode information, and N is a positive integer.

In some embodiments of the present invention, a block encoding mode indicated by the block encoding mode information may be a Merge mode or a Skip mode or another block encoding mode.

In some embodiments of the present invention, the determining unit 720 may be specifically configured to: if the processing information is the block partition depth information and a block partition depth of the current block is greater than or equal to a first block partition depth, determine that the block partition manner of the current block is skipping partitioning, where the first block partition depth is greater than or equal to a maximum value of a block partition depth of the N related blocks; or if the processing information is the block encoding mode information and a block encoding mode indicated by block encoding mode information of the N related blocks is the Merge mode, determine that the block partition manner of the current block is skipping partitioning;

or if the processing information is the block partition depth information and the block encoding mode information, a block partition depth of the current block is greater than or equal to a first block partition depth, and a block encoding mode indicated by block encoding mode information of the N related blocks is the Merge mode, determine that the block partition manner of the current block is skipping partitioning, where the first block partition depth is greater than or equal to a maximum value of a block partition depth of the N related blocks.

In some embodiments of the present invention, the determining unit 720 may be specifically configured to: if the processing information is the block partition depth information and a block partition depth of the current block is less than a first block partition depth, determine the block partition manner of the current block according to a first preset condition, where the first block partition depth is greater than or equal to a maximum value of a block partition depth of the N related blocks;

or if the processing information is the block encoding mode information and a block encoding mode indicated by block encoding mode information of at least one block of the N related blocks is not the Merge mode, determine the block partition manner of the current block according to a first preset condition;

or if the processing information is the block partition depth information and the block encoding mode information, a block partition depth of the current block is less than a first block partition depth, and a block encoding mode indicated by block encoding mode information of at least one block of the N related blocks is not the Merge mode, determine the block partition manner of the current block according to a first preset condition, where the first block partition depth is greater than or equal to a maximum value of a block partition depth of the N related blocks.

In some embodiments of the present invention, there may be various specific implementation manners of determining, by the determining unit 720, the block partition manner of the current block according to the first preset condition. For example, the determining, by the determining unit 720, the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

Referring to FIG. 7-b, in some embodiments of the present invention, the video encoder 700 may further include:

a processing unit 730, configured to: determine a block partition flag corresponding to the block partition manner of the current block; and if the processing information is the block partition depth information and the block partition depth of the current block is greater than or equal to the first block partition depth, skip carrying the block partition flag in a bitstream corresponding to the current block, where the first block partition depth is greater than or equal to the maximum value of the block partition depth of the N related blocks;

or if the processing information is the block encoding mode information and the block encoding mode indicated by the block encoding mode information of the N related blocks is the Merge mode, skip carrying the block partition flag in a bitstream corresponding to the current block;

or if the processing information is the block partition depth information and the block encoding mode information, the block partition depth of the current block is greater than or equal to the first block partition depth, and the block encoding mode indicated by the block encoding mode information of the N related blocks is the Merge mode, skip carrying the block partition flag in a bitstream corresponding to the current block, where the first block partition depth is greater than or equal to the maximum value of the block partition depth of the N related blocks.

In some embodiments of the present invention, the processing unit 730 may further be configured to: if the processing information is the block partition depth information and the block partition depth of the current block is less than the first block partition depth, write the block partition flag into the bitstream corresponding to the current block, where the first block partition depth is greater than or equal to the maximum value of the block partition depth of the N related blocks;

or if the processing information is the block encoding mode information and the block encoding mode indicated by the block encoding mode information of the at least one block of the N related blocks is not the Merge mode, write the block partition flag into the bitstream corresponding to the current block;

or if the processing information is the block partition depth information and the block encoding mode information, the block partition depth of the current block is less than the first block partition depth, and the block encoding mode indicated by the block encoding mode information of the at least one block of the N related blocks is not the Merge mode, write the block partition flag into the bitstream corresponding to the current block, where the first block partition depth is greater than or equal to the maximum value of the block partition depth of the N related blocks.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already encoded when the first texture view is encoded, where the first texture view and the second texture view are corresponding to a same moment or different moments.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already encoded when the depth map is encoded, and the depth map and the texture view are corresponding to a same moment or different moments.

It may be understood that, function modules of the video encoder 700 according to this embodiment may specifically be implemented according to the methods in the foregoing method embodiments. For a specific implementation process thereof, reference may be made to related descriptions of the foregoing method embodiments, and details are not described herein again.

It may be learned that, in this embodiment, a video encoder 700 acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the video encoder may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video encoding process.

Further, because in some scenarios, the video encoder may not write a block partition flag corresponding to the current block into a bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

Referring to FIG. 8, an embodiment of the present invention provides a video decoder 800, which may include:

an acquiring unit 810 and a determining unit 820.

The acquiring unit 810 is configured to acquire processing information of N related blocks of a current block.

The determining unit 820 is configured to determine a block partition manner of the current block according to the processing information of the N related blocks; where the N related blocks include at least one neighboring block of the current block, a reference block of the current block, and/or at least one neighboring block of the reference block, the processing information is block partition depth information and/or block encoding mode information, and N is a positive integer.

In some embodiments of the present invention, a block encoding mode indicated by the block encoding mode information may be a Merge mode or a Skip mode or another block encoding mode.

In some embodiments of the present invention, the determining unit 820 may be specifically configured to: when a bitstream corresponding to the current block does not carry a block partition flag corresponding to the current block, determine the block partition manner of the current block according to the processing information of the N related blocks.

Referring to FIG. 8-b, in some embodiments of the present invention, the video decoder 800 may further include:

a second determining unit 830, configured to: when the bitstream corresponding to the current block carries the block partition flag corresponding to the current block, determine the block partition manner of the current block according to the block partition flag.

In some embodiments of the present invention, in an aspect of the determining a block partition manner of the current block according to the processing information of the N related blocks, the determining unit 820 may be specifically configured to: if the processing information is the block partition depth information and a block partition depth of the current block is greater than or equal to a first block partition depth, determine that the block partition manner of the current block is skipping partitioning, where the first block partition depth is greater than or equal to a maximum value of a block partition depth of the N related blocks; or if the processing information is the block encoding mode information and a block encoding mode indicated by block encoding mode information of the N related blocks is the Merge mode, determine that the block partition manner of the current block is skipping partitioning;

or if the processing information is the block partition depth information and the block encoding mode information, a block partition depth of the current block is greater than or equal to a first block partition depth, and a block encoding mode indicated by block encoding mode information of the N related blocks is the Merge mode, determine that the block partition manner of the current block is skipping partitioning, where the first block partition depth is greater than or equal to a maximum value of a block partition depth of the N related blocks.

In some embodiments of the present invention, in an aspect of the determining a block partition manner of the current block according to the processing information of the N related blocks, the determining unit 820 is specifically configured to: if the processing information is the block partition depth information and a block partition depth of the current block is less than a first block partition depth, determine the block partition manner of the current block according to a first preset condition, where the first block partition depth is greater than or equal to a maximum value of a block partition depth of the N related blocks;

or if the processing information is the block encoding mode information and a block encoding mode indicated by block encoding mode information of at least one block of the N related blocks is not the Merge mode, determine the block partition manner of the current block according to a first preset condition;

or if the processing information is the block partition depth information and the block encoding mode information, a block partition depth of the current block is less than a first block partition depth, and a block encoding mode indicated by block encoding mode infatuation of at least one block of the N related blocks is not the Merge mode, determine the block partition manner of the current block according to a first preset condition, where the first block partition depth is greater than or equal to a maximum value of a block partition depth of the N related blocks.

There may be various specific implementation manners of determining, by the determining unit 820, the block partition manner of the current block according to the first preset condition. For example, the determining, by the determining unit 820, the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already decoded when the first texture view is decoded, where the first texture view and the second texture view are corresponding to a same moment or different moments. It may be understood that, the foregoing scenario may be corresponding to multi-view video decoding.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already decoded when the depth map is decoded, and the depth map and the texture view are corresponding to a same moment or different moments. It may be understood that, the foregoing scenario may be corresponding to multi-view video decoding with a depth map.

It may be understood that, function modules of a video encoder 800 according to this embodiment may specifically be implemented according to the methods in the foregoing method embodiments. For a specific implementation process thereof, reference may be made to related descriptions of the foregoing method embodiments, and details are not described herein again.

It may be learned that, in this embodiment, a video decoder 800 acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the video decoder may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video decoding process.

Further, because the video decoder may determine the block partition manner of the current block based on set logic, in some scenarios, an encoder side may not write a block partition flag corresponding to the current block into a bitstream corresponding to the current block. Therefore, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

Referring to FIG. 9, FIG. 9 is a schematic diagram of a video encoding device 900 according to an embodiment of the present invention. The video encoding device 900 may include at least one bus 901, at least one processor 902 connected to the bus 901, and at least one memory 903 connected to the bus 601.

The processor 902 invokes code stored in the memory 903 by using the bus 901, so as to: acquire processing information of N related blocks of a current block; and determine a block partition manner of the current block according to the processing information of the N related blocks.

The processing information is block partition depth information and/or the block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

The determining, by the processor 902, the block partition manner of the current block may specifically be determining not to partition the current block or determining to partition the current block, that is, determining whether to partition the current block according to the processing information of the N related blocks.

In some embodiments of the present invention, a block encoding mode indicated by the block encoding mode information may be a Merge mode or a Skip mode or another block encoding mode.

The processing information of the N related blocks is block partition depth information and/or block encoding mode information of the N related blocks. Therefore, the processor 902 may determine, based on multiple manners, the block partition manner of the current block according to the processing information of the N related blocks.

For example, the determining, by the processor 902, the block partition manner of the current block according to the processing information of the N related blocks may include: if the processing information is the block partition depth information and a block partition depth of the current block is greater than or equal to a first block partition depth, determining that the block partition manner of the current block is skipping partitioning, where the first block partition depth is greater than or equal to a maximum value of a block partition depth of the N related blocks; or, if the processing information is the block encoding mode information and a block encoding mode indicated by block encoding mode information of the N related blocks is the Merge mode, determining that the block partition manner of the current block is skipping partitioning; or, if the processing information is the block partition depth information and the block encoding mode information, a block partition depth of the current block is greater than or equal to a first block partition depth, and a block encoding mode indicated by block encoding mode information of the N related blocks is the Merge mode, determining that the block partition manner of the current block is skipping partitioning, where the first block partition depth is greater than or equal to a maximum value of a block partition depth of the N related blocks. It is found, through tests, that the foregoing example of determining the block partition manner of the current block features simple computation and higher reliability, and has a relatively high implementation value.

For another example, the determining, by the processor 902, the block partition manner of the current block according to the processing information of the N related blocks may include that: if the processing information is the block partition depth information and a block partition depth of the current block is less than a first block partition depth, it may be determined that the block partition manner of the current block is partitioning, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, it may be determined that the block partition manner of the current block is partitioning; or, if the processing information is the block partition depth information and the block encoding mode information, a block partition depth of the current block is less than a first block partition depth, and a block encoding mode indicated by block encoding mode information of at least one block of the N related blocks is not the Merge mode, it may be determined that the block partition manner of the current block is partitioning, where the first block partition depth is greater than or equal to a maximum value of a block partition depth of the N related blocks.

For another example, the determining, by the processor 902, the block partition manner of the current block according to the processing information of the N related blocks may include that: if the processing information is the block partition depth information and a block partition depth of the current block is less than a first block partition depth, the block partition manner of the current block may be determined according to a first preset condition, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, the block partition manner of the current block may be determined according to a first preset condition; or, if the processing information is the block partition depth information and the block encoding mode information, a block partition depth of the current block is less than a first block partition depth, and a block encoding mode indicated by block encoding mode information of at least one block of the N related blocks is not the Merge mode, the block partition manner of the current block may be determined according to a first preset condition, where the first block partition depth is greater than or equal to a maximum value of a block partition depth of the N related blocks.

There may be various specific implementation manners of determining, by the processor 902, the block partition manner of the current block according to the first preset condition. For example, the determining, by the processor 902, the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, the processor 902 may further: determine a block partition flag corresponding to the block partition manner of the current block; and if the processing information is the block partition depth information and the block partition depth of the current block is greater than or equal to the first block partition depth, skip carrying the block partition flag in a bitstream corresponding to the current block, where the first block partition depth is greater than or equal to the maximum value of the block partition depth of the N related blocks; or, if the processing information is the block encoding mode information and the block encoding mode indicated by the block encoding mode information of the N related blocks is the Merge mode, skip carrying the block partition flag in a bitstream corresponding to the current block; or, if the processing information is the block partition depth information and the block encoding mode information, the block partition depth of the current block is greater than or equal to the first block partition depth, and the block encoding mode indicated by the block encoding mode information of the N related blocks is the Merge mode, skip carrying the block partition flag in a bitstream corresponding to the current block, where the first block partition depth is greater than or equal to the maximum value of the block partition depth of the N related blocks.

In some embodiments of the present invention, the processor 902 may further be configured to: if the processing information is the block partition depth information and the block partition depth of the current block is less than the first block partition depth, write the block partition flag into the bitstream corresponding to the current block, where the first block partition depth is greater than or equal to the maximum value of the block partition depth of the N related blocks; or, if the processing information is the block encoding mode information and the block encoding mode indicated by the block encoding mode information of the at least one block of the N related blocks is not the Merge mode, write the block partition flag into the bitstream corresponding to the current block; or, if the processing information is the block partition depth information and the block encoding mode information, the block partition depth of the current block is less than the first block partition depth, and the block encoding mode indicated by the block encoding mode information of the at least one block of the N related blocks is not the Merge mode, write the block partition flag into the bitstream corresponding to the current block, where the first block partition depth is greater than or equal to the maximum value of the block partition depth of the N related blocks, and the block partition flag corresponding to the block partition manner of the current block indicates whether to partition the current block, where the block partition manner of the current block may be determined according to the first preset condition.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already encoded when the first texture view is encoded, where the first texture view and the second texture view are corresponding to a same moment or different moments.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already encoded when the depth map is encoded, and the depth map and the texture view are corresponding to a same moment or different moments.

It may be understood that, function modules of the video encoding device 900 according to this embodiment may specifically be implemented according to the methods in the foregoing method embodiments. For a specific implementation process thereof, reference may be made to related descriptions of the foregoing method embodiments, and details are not described herein again.

It may be learned that, a video encoding device 900 according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the video encoding device 900 may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video encoding process.

Further, because in some scenarios, the video encoding device 900 may not write a block partition flag corresponding to the current block into a bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

Referring to FIG. 10, FIG. 10 is a schematic diagram of a video encoding device 1000 according to an embodiment of the present invention. The video encoding device 1000 may include at least one bus 1001, at least one processor 1002 connected to the bus 1001, and at least one memory 1003 connected to the bus 601.

The processor 1002 invokes code stored in the memory 1003 by using the bus 1001, so as to: acquire processing information of N related blocks of a current block; and determine a block partition manner of the current block according to the processing information of the N related blocks.

The processing information is block partition depth information and/or the block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

The determining, by the processor 1002, the block partition manner of the current block may specifically be determining not to partition the current block or determining to partition the current block, that is, determining whether to partition the current block according to the processing information of the N related blocks.

In some embodiments of the present invention, a block encoding mode indicated by the block encoding mode information may be a Merge mode or a Skip mode or another block encoding mode.

The processing information of the N related blocks is block partition depth information and/or block encoding mode information of the N related blocks. Therefore, the processor 1002 may determine, based on multiple manners, the block partition manner of the current block according to the processing information of the N related blocks.

In some embodiments of the present invention, the determining, by the processor 1002, the block partition manner of the current block according to the processing information of the N related blocks may include: when a bitstream corresponding to the current block does not carry a block partition flag corresponding to the current block, determining the block partition manner of the current block according to the processing information of the N related blocks. Further, when the bitstream corresponding to the current block carries the block partition flag corresponding to the current block, the processor 1002 may also determine the block partition manner of the current block, for example, according to the block partition flag. Alternatively, when the bitstream corresponding to the current block carries the block partition flag corresponding to the current block, the block partition manner of the current block may also be determined, for example, according to the processing information of the N related blocks.

It may be understood that, because in some scenarios, an encoder may not write the block partition flag corresponding to the current block into the bitstream corresponding to the current block, and a video decoding device 1000 may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

For example, the determining, by the processor 1002, the block partition manner of the current block according to the processing information of the N related blocks may include that: if the processing information is the block partition depth information and a block partition depth of the current block is greater than or equal to a first block partition depth, it may be determined that the block partition manner of the current block is skipping partitioning, where the first block partition depth is greater than or equal to a maximum value of a block partition depth of the N related blocks; or, if the processing information is the block encoding mode information and a block encoding mode indicated by block encoding mode information of the N related blocks is the Merge mode, it is determined that the block partition manner of the current block is skipping partitioning; or, if the processing information is the block partition depth information and the block encoding mode information, a block partition depth of the current block is greater than or equal to a first block partition depth, and a block encoding mode indicated by block encoding mode information of the N related blocks is the Merge mode, it is determined that the block partition manner of the current block is skipping partitioning, where the first block partition depth is greater than or equal to a maximum value of a block partition depth of the N related blocks. It is found, through tests, that the foregoing several exemplary mechanisms of determining the block partition manner of the current block feature simple computation and higher reliability, and have a relatively high implementation value.

For another example, the determining, by the processor 1002, the block partition manner of the current block according to the processing information of the N related blocks may include that: if the processing information is the block partition depth information and a block partition depth of the current block is less than a first block partition depth, it may be determined that the block partition manner of the current block is partitioning, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, it may be determined that the block partition manner of the current block is partitioning; or, if the processing information is the block partition depth information and the block encoding mode information, a block partition depth of the current block is less than a first block partition depth, and a block encoding mode indicated by block encoding mode information of at least one block of the N related blocks is not the Merge mode, it may be determined that the block partition manner of the current block is partitioning, where the first block partition depth is greater than or equal to a maximum value of a block partition depth of the N related blocks.

For another example, the determining, by the processor 1002, the block partition manner of the current block according to the processing information of the N related blocks may include that: if the processing information is the block partition depth information and a block partition depth of the current block is less than a first block partition depth, the block partition manner of the current block may be determined according to a first preset condition, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, the block partition manner of the current block may be determined according to a first preset condition; or, if the processing information is the block partition depth information and the block encoding mode information, a block partition depth of the current block is less than a first block partition depth, and a block encoding mode indicated by block encoding mode information of at least one block of the N related blocks is not the Merge mode, the block partition manner of the current block may be determined according to a first preset condition, where the first block partition depth is greater than or equal to a maximum value of a block partition depth of the N related blocks.

There may be various specific implementation manners of determining, by the processor 1002, the block partition manner of the current block according to the first preset condition. For example, the determining, by the processor 1002, the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already decoded when the first texture view is decoded, where the first texture view and the second texture view are corresponding to a same moment or different moments. It may be understood that, the foregoing scenario may be corresponding to multi-view video decoding.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already decoded when the depth map is decoded, and the depth map and the texture view are corresponding to a same moment or different moments. It may be understood that, the foregoing scenario may be corresponding to multi-view video decoding with a depth map.

It may be understood that, function modules of the video decoding device 1000 according to this embodiment may specifically be implemented according to the methods in the foregoing method embodiments. For a specific implementation process thereof, reference may be made to related descriptions of the foregoing method embodiments, and details are not described herein again.

It may be learned that, a video decoding device 1000 according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the video decoding device 1000 may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video decoding process.

Further, because the video decoding device 1000 may determine the block partition manner of the current block based on set logic, in some scenarios, an encoder side may not write a block partition flag corresponding to the current block into a bitstream corresponding to the current block. Therefore, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

An embodiment of the present invention further provides a method for encoding a block partition flag in video encoding, including:

acquiring processing information of N related blocks of a current block; and determining a block partition manner of the current block according to the processing information of the N related blocks; where the processing information is block partition depth information and/or block encoding mode information, N is a positive integer, and the N related blocks include at least one of the following picture blocks: at least one neighboring block of the current block, a reference block of the current block, and at least one neighboring block of the reference block; determining a block partition flag corresponding to the block partition manner of the current block; and if the processing information is the block partition depth information and a block partition depth of the current block is greater than or equal to a first block partition depth, skipping carrying the block partition flag in a bitstream corresponding to the current block, where the first block partition depth is greater than or equal to a maximum value of a block partition depth of the N related blocks; or, if the processing information is the block encoding mode information and a block encoding mode indicated by the block encoding mode information of the N related blocks is a Merge mode, skipping carrying the block partition flag in a bitstream corresponding to the current block; or, if the processing information is the block partition depth information and the block encoding mode information, a block partition depth of the current block is greater than or equal to a first block partition depth, and a block encoding mode indicated by the block encoding mode information of the N related blocks is a Merge mode, skipping carrying the block partition flag in a bitstream corresponding to the current block, where the first block partition depth is greater than or equal to a maximum value of a block partition depth of the N related blocks; or if the processing information is the block partition depth information and a block partition depth of the current block is less than a first block partition depth, writing the block partition flag into a bitstream corresponding to the current block, where the first block partition depth is greater than or equal to a maximum value of a block partition depth of the N related blocks; or, if the processing information is the block encoding mode information and a block encoding mode indicated by block encoding mode information of at least one block of the N related blocks is not a Merge mode, writing the block partition flag into a bitstream corresponding to the current block; or, if the processing information is the block partition depth information and the block encoding mode information, a block partition depth of the current block is less than a first block partition depth, and a block encoding mode indicated by block encoding mode information of at least one block of the N related blocks is not a Merge mode, writing the block partition flag into a bitstream corresponding to the current block, where the first block partition depth is greater than or equal to a maximum value of a block partition depth of the N related blocks, and the block partition flag corresponding to the block partition manner of the current block indicates whether to partition the current block, where the block partition manner of the current block may be determined according to the first preset condition.

If the processing information is the block partition depth information, and the block partition depth of the current block is less than the first block partition depth, the block partition manner of the current block may be determined according to the first preset condition, where the first block partition depth is greater than or equal to the maximum value of the block partition depth of the N related blocks; or, if the processing information is the block encoding mode information and the block encoding mode indicated by the block encoding mode information of the at least one block of the N related blocks is not the Merge mode, the block partition manner of the current block may be determined according to the first preset condition; or, if the processing information is the block partition depth information and the block encoding mode information, the block partition depth of the current block is less than the first block partition depth, and the block encoding mode indicated by the block encoding mode information of the at least one block of the N related blocks is not the Merge mode, the block partition manner of the current block may be determined according to the first preset condition, where the first block partition depth is greater than or equal to the maximum value of the block partition depth of the N related blocks.

There may be various specific implementation manners of determining the block partition manner of the current block according to the first preset condition. For example, the determining the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

It may be learned that, an encoder side according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the encoder side may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video encoding process.

Further, because in some scenarios, the encoder side may not write a block partition flag corresponding to the current block into a bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

An embodiment of the present invention further provides a method for decoding a block partition flag in video encoding, including:

when a bitstream corresponding to a current block carries a block partition flag corresponding to the current block, determining a block partition manner of the current block according to processing information of the N related blocks; and when the bitstream corresponding to the current block does not carry the block partition flag corresponding to the current block, acquiring processing information of N related blocks of the current block, and determining the block partition manner of the current block according to the processing information of the N related blocks; where the N related blocks include at least one neighboring block of the current block, a reference block of the current block, and/or at least one neighboring block of the reference block, the processing information is block partition depth information and/or block encoding mode information, and N is a positive integer.

For example, the determining a block partition manner of the current block according to processing information of the N related blocks may include: if the processing information is the block partition depth information and a block partition depth of the current block is greater than or equal to a first block partition depth, determining that the block partition manner of the current block is skipping partitioning, where the first block partition depth is greater than or equal to a maximum value of a block partition depth of the N related blocks; or, if the processing information is the block encoding mode information and a block encoding mode indicated by block encoding mode information of the N related blocks is a Merge mode, determining that the block partition manner of the current block is skipping partitioning; or, if the processing information is the block partition depth information and the block encoding mode information, a block partition depth of the current block is greater than or equal to a first block partition depth, and a block encoding mode indicated by block encoding mode information of the N related blocks is a Merge mode, determining that the block partition manner of the current block is skipping partitioning, where the first block partition depth is greater than or equal to a maximum value of a block partition depth of the N related blocks. It is found, through tests, that the foregoing several exemplary mechanisms of determining the block partition manner of the current block feature simple computation and higher reliability, and have a relatively high implementation value.

For another example, the determining a block partition manner of the current block according to processing information of the N related blocks may include that: if the processing information is the block partition depth information and a block partition depth of the current block is less than a first block partition depth, it may be determined that the block partition manner of the current block is partitioning, where the first block partition depth is greater than or equal to a maximum value of a block partition depth of the N related blocks; or, if the processing information is the block encoding mode information and a block encoding mode indicated by block encoding mode information of at least one block of the N related blocks is not a Merge mode, it may be determined that the block partition manner of the current block is partitioning; or, if the processing information is the block partition depth information and the block encoding mode information, a block partition depth of the current block is less than a first block partition depth, and a block encoding mode indicated by block encoding mode information of at least one block of the N related blocks is not a Merge mode, it may be determined that the block partition manner of the current block is partitioning, where the first block partition depth is greater than or equal to a maximum value of a block partition depth of the N related blocks.

For another example, the determining a block partition manner of the current block according to processing information of the N related blocks may include that: if the processing information is the block partition depth information and a block partition depth of the current block is less than a first block partition depth, the block partition manner of the current block may be determined according to a first preset condition, where the first block partition depth is greater than or equal to a maximum value of a block partition depth of the N related blocks; or, if the processing information is the block encoding mode information and a block encoding mode indicated by block encoding mode information of at least one block of the N related blocks is not a Merge mode, the block partition manner of the current block may be determined according to a first preset condition; or, if the processing information is the block partition depth information and the block encoding mode information, a block partition depth of the current block is less than a first block partition depth, and a block encoding mode indicated by block encoding mode information of at least one block of the N related blocks is not a Merge mode, the block partition manner of the current block may be determined according to a first preset condition, where the first block partition depth is greater than or equal to a maximum value of a block partition depth of the N related blocks.

There may be various specific implementation manners of determining the block partition manner of the current block according to the first preset condition. For example, the determining the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already decoded when the first texture view is decoded, where the first texture view and the second texture view are corresponding to a same moment or different moments. It may be understood that, the foregoing scenario may be corresponding to multi-view video decoding.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already decoded when the depth map is decoded, and the depth map and the texture view are corresponding to a same moment or different moments. It may be understood that, the foregoing scenario may be corresponding to multi-view video decoding with a depth map.

It may be learned that, a decoder side according to this embodiment determines a block partition manner of a current block according to processing information of the N related blocks when a bitstream corresponding to the current block carries a block partition flag corresponding to the current block; and acquires processing information of N related blocks of the current block, and determines the block partition manner of the current block according to the processing information of the N related blocks, when the bitstream corresponding to the current block does not carry the block partition flag corresponding to the current block; where the N related blocks include at least one neighboring block of the current block, a reference block of the current block, and/or at least one neighboring block of the reference block, the processing information is block partition depth information and/or block encoding mode information, and N is a positive integer. Because the decoder side may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video decoding process.

Further, because the decoder side may determine the block partition manner of the current block based on set logic, in some scenarios, an encoder side may not write the block partition flag corresponding to the current block into the bitstream corresponding to the current block. Therefore, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

An embodiment of the present invention further provides a video encoding processing method, which may include: acquiring processing information of N related blocks of a current block; determining a block partition manner of the current block according to the processing information of the N related blocks; and encoding the current block based on the determined block partition manner of the current block; where the processing information is block partition depth information and/or block encoding mode information, N is a positive integer, and the N related blocks include at least one of the following picture blocks: at least one neighboring block of the current block, a reference block of the current block, and at least one neighboring block of the reference block.

Figure 11:
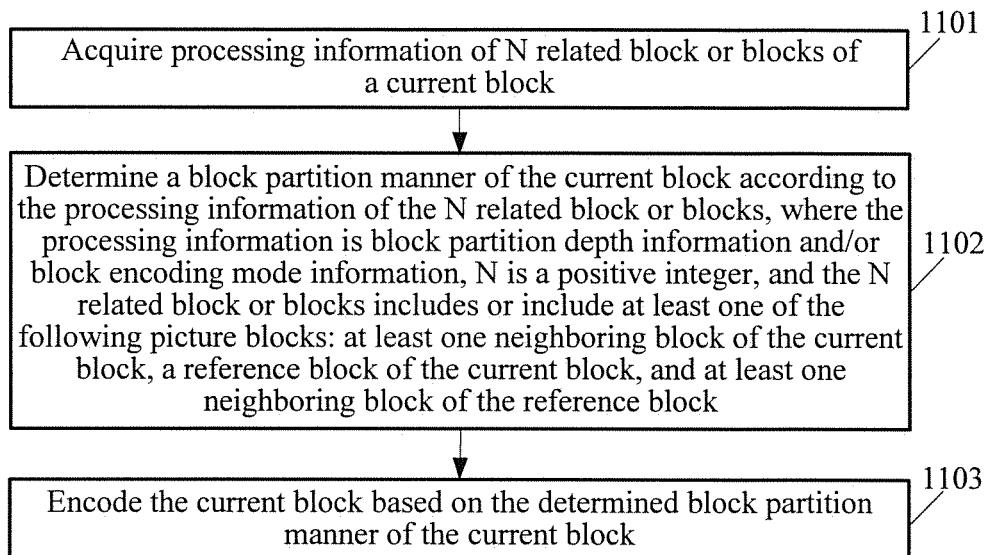
FIG. 11 is a schematic flowchart of a video encoding method according to an embodiment of the present invention.

Referring to FIG. 11, FIG. 11 is a schematic flowchart of a video encoding method according to an embodiment of the present invention. As shown in FIG. 11, the video encoding method provided in this embodiment of the present invention may include the following content:

1101. Acquire processing information of N related blocks of a current block.

1102. Determine a block partition manner of the current block according to the processing information of the N related blocks.

1103. Encode the current block based on the determined block partition manner of the current block.

The processing information is block partition depth information and/or the block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

The determining a block partition manner of the current block may specifically be determining not to partition the current block or determining to partition the current block, that is, determining whether to partition the current block according to the processing information of the N related blocks.

In some embodiments of the present invention, a block encoding mode indicated by the block encoding mode information may be a Merge mode or a Skip mode or another block encoding mode.

The processing information of the N related blocks is block partition depth information and/or block encoding mode information of the N related blocks. Therefore, the block partition manner of the current block may be determined based on multiple manners according to the processing information of the N related blocks.

For example, the determining a block partition manner of the current block according to the processing information of the N related blocks may include: if the processing information is the block partition depth information and a block partition depth of the current block is greater than or equal to a first block partition depth, determining that the block partition manner of the current block is skipping partitioning, where the first block partition depth is greater than or equal to a maximum value of a block partition depth of the N related blocks; or, if the processing information is the block encoding mode information and a block encoding mode indicated by block encoding mode information of the N related blocks is a Merge mode, determining that the block partition manner of the current block is skipping partitioning; or, if the processing information is the block partition depth information and the block encoding mode information, a block partition depth of the current block is greater than or equal to a first block partition depth, and a block encoding mode indicated by block encoding mode information of the N related blocks is a Merge mode, determining that the block partition manner of the current block is skipping partitioning, where the first block partition depth is greater than or equal to a maximum value of a block partition depth of the N related blocks. It is found, through tests, that the foregoing example of determining the block partition manner of the current block features simple computation and higher reliability, and has a relatively high implementation value.

For another example, the determining a block partition manner of the current block according to the processing information of the N related blocks may include that: if the processing information is the block partition depth information and a block partition depth of the current block is less than a first block partition depth, it may be determined that the block partition manner of the current block is partitioning, where the first block partition depth is greater than or equal to a maximum value of a block partition depth of the N related blocks; or, if the processing information is the block encoding mode information and a block encoding mode indicated by block encoding mode information of at least one block of the N related blocks is not a Merge mode, it may be determined that the block partition manner of the current block is partitioning; or, if the processing information is the block partition depth information and the block encoding mode information, a block partition depth of the current block is less than a first block partition depth, and a block encoding mode indicated by block encoding mode information of at least one block of the N related blocks is not a Merge mode, it may be determined that the block partition manner of the current block is partitioning, where the first block partition depth is greater than or equal to a maximum value of a block partition depth of the N related blocks.

For another example, the determining a block partition manner of the current block according to the processing information of the N related blocks may include that: if the processing information is the block partition depth information and a block partition depth of the current block is less than a first block partition depth, the block partition manner of the current block may be determined according to a first preset condition, where the first block partition depth is greater than or equal to a maximum value of a block partition depth of the N related blocks; or, if the processing information is the block encoding mode information and a block encoding mode indicated by block encoding mode information of at least one block of the N related blocks is not a Merge mode, the block partition manner of the current block may be determined according to a first preset condition; or, if the processing information is the block partition depth information and the block encoding mode information, a block partition depth of the current block is less than a first block partition depth, and a block encoding mode indicated by block encoding mode information of at least one block of the N related blocks is not a Merge mode, the block partition manner of the current block may be determined according to a first preset condition, where the first block partition depth is greater than or equal to a maximum value of a block partition depth of the N related blocks.

There may be various specific implementation manners of determining the block partition manner of the current block according to the first preset condition. For example, the determining the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, the method may further include: determining a block partition flag corresponding to the block partition manner of the current block; and if the processing information is the block partition depth information and the block partition depth of the current block is greater than or equal to the first block partition depth, skipping carrying the block partition flag in a bitstream corresponding to the current block, where the first block partition depth is greater than or equal to the maximum value of the block partition depth of the N related blocks; or, if the processing information is the block encoding mode information and the block encoding mode indicated by the block encoding mode information of the N related blocks is the Merge mode, skipping carrying the block partition flag in a bitstream corresponding to the current block; or, if the processing information is the block partition depth information and the block encoding mode information, the block partition depth of the current block is greater than or equal to the first block partition depth, and the block encoding mode indicated by the block encoding mode information of the N related blocks is the Merge mode, skipping carrying the block partition flag in a bitstream corresponding to the current block, where the first block partition depth is greater than or equal to the maximum value of the block partition depth of the N related blocks.

In some embodiments of the present invention, the method may further include: determining a block partition flag corresponding to the block partition manner of the current block; and if the processing information is the block partition depth information and the block partition depth of the current block is less than the first block partition depth, writing the block partition flag into the bitstream corresponding to the current block, where the first block partition depth is greater than or equal to the maximum value of the block partition depth of the N related blocks; or, if the processing information is the block encoding mode information and the block encoding mode indicated by the block encoding mode information of the at least one block of the N related blocks is not the Merge mode, writing the block partition flag into the bitstream corresponding to the current block; or, if the processing information is the block partition depth information and the block encoding mode information, the block partition depth of the current block is less than the first block partition depth, and the block encoding mode indicated by the block encoding mode information of the at least one block of the N related blocks is not the Merge mode, writing the block partition flag into the bitstream corresponding to the current block, where the first block partition depth is greater than or equal to the maximum value of the block partition depth of the N related blocks, and the block partition flag corresponding to the block partition manner of the current block indicates whether to partition the current block, where the block partition manner of the current block may be determined according to the first preset condition.

It may be learned that, an encoder side according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the encoder side may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video encoding process.

It may be understood that, because in some scenarios, an encoder may not write a block partition flag corresponding to the current block into a bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

An embodiment of the present invention further provides a video decoding processing method, which may include: acquiring processing information of N related blocks of a current block; determining a block partition manner of the current block according to the processing information of the N related blocks; and decoding, based on the determined block partition manner of the current block, a bitstream corresponding to the current block; where the N related blocks include at least one neighboring block of the current block, a reference block of the current block, and/or at least one neighboring block of the reference block, the processing information is block partition depth information and/or block encoding mode information, and N is a positive integer.

Figure 12:
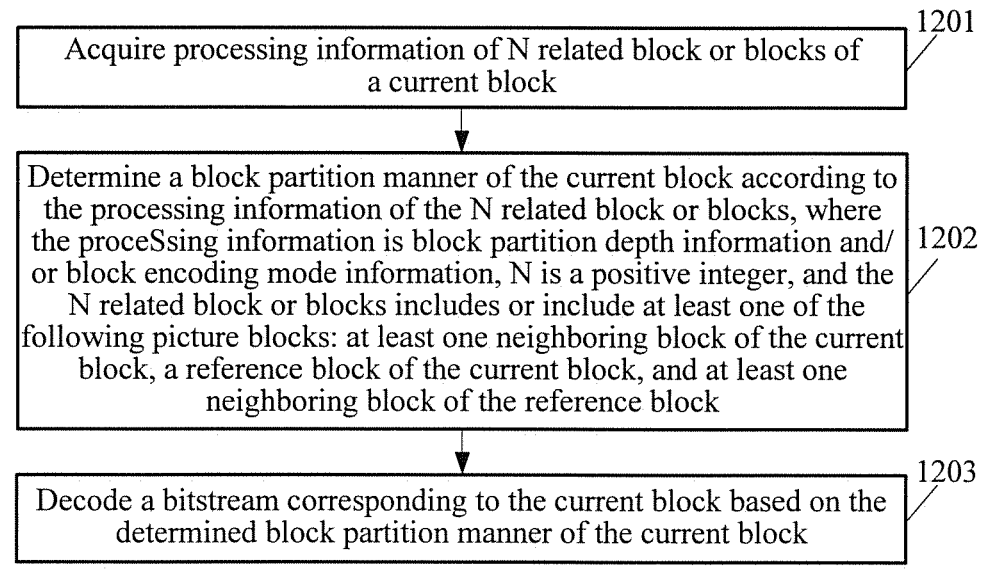
FIG. 12 is a schematic flowchart of a video decoding method according to an embodiment of the present invention.

Referring to FIG. 12, FIG. 12 is a schematic flowchart of a video decoding method according to an embodiment of the present invention. As shown in FIG. 12, the video decoding method provided in this embodiment of the present invention may include the following content:

1201. Acquire processing information of N related blocks of a current block.

1202. Determine a block partition manner of the current block according to the processing information of the N related blocks.

1203. Decode a bitstream corresponding to the current block based on the determined block partition manner of the current block.

The N related blocks include at least one neighboring block of the current block, a reference block of the current block, and/or at least one neighboring block of the reference block, the processing information is block partition depth information and/or block encoding mode information, and N is a positive integer.

The processing information is the block partition depth information and/or the block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

The determining a block partition manner of the current block may specifically be determining not to partition the current block or determining to partition the current block, that is, determining whether to partition the current block according to the processing information of the N related blocks.

In some embodiments of the present invention, a block encoding mode indicated by the block encoding mode information may be a Merge mode or a Skip mode or another block encoding mode.

The processing information of the N related blocks is block partition depth information and/or block encoding mode information of the N related blocks. Therefore, the block partition manner of the current block may be determined based on multiple manners according to the processing information of the N related blocks.

In some embodiments of the present invention, the determining a block partition manner of the current block according to the processing information of the N related blocks may include: when the bitstream corresponding to the current block does not carry a block partition flag corresponding to the current block, determining the block partition manner of the current block according to the processing information of the N related blocks. Further, when the bitstream corresponding to the current block carries the block partition flag corresponding to the current block, the block partition manner of the current block may also be determined, for example, according to the block partition flag. Alternatively, when the bitstream corresponding to the current block carries the block partition flag corresponding to the current block, the block partition manner of the current block may also be determined, for example, according to the processing information of the N related blocks.

It may be understood that, because in some scenarios, an encoder may not write the block partition flag corresponding to the current block into the bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

For example, the determining a block partition manner of the current block according to the processing information of the N related blocks may include: if the processing information is the block partition depth information and a block partition depth of the current block is greater than or equal to a first block partition depth, determining that the block partition manner of the current block is skipping partitioning, where the first block partition depth is greater than or equal to a maximum value of a block partition depth of the N related blocks; or, if the processing information is the block encoding mode information and a block encoding mode indicated by block encoding mode information of the N related blocks is the Merge mode, determining that the block partition manner of the current block is skipping partitioning; or, if the processing information is the block partition depth information and the block encoding mode information, a block partition depth of the current block is greater than or equal to a first block partition depth, and a block encoding mode indicated by block encoding mode information of the N related blocks is the Merge mode, determining that the block partition manner of the current block is skipping partitioning, where the first block partition depth is greater than or equal to a maximum value of a block partition depth of the N related blocks. It is found, through tests, that the foregoing several exemplary mechanisms of determining the block partition manner of the current block feature simple computation and higher reliability, and have a relatively high implementation value.

For another example, the determining a block partition manner of the current block according to the processing information of the N related blocks may include that: if the processing information is the block partition depth information and a block partition depth of the current block is less than a first block partition depth, it may be determined that the block partition manner of the current block is partitioning, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, it may be determined that the block partition manner of the current block is partitioning; or, if the processing information is the block partition depth information and the block encoding mode information, a block partition depth of the current block is less than a first block partition depth, and a block encoding mode indicated by block encoding mode information of at least one block of the N related blocks is not the Merge mode, it may be determined that the block partition manner of the current block is partitioning, where the first block partition depth is greater than or equal to a maximum value of a block partition depth of the N related blocks.

For another example, the determining a block partition manner of the current block according to the processing information of the N related blocks may include that: if the processing information is the block partition depth information and a block partition depth of the current block is less than a first block partition depth, the block partition manner of the current block may be determined according to a first preset condition, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, the block partition manner of the current block may be determined according to a first preset condition; or, if the processing information is the block partition depth information and the block encoding mode information, a block partition depth of the current block is less than a first block partition depth, and a block encoding mode indicated by block encoding mode information of at least one block of the N related blocks is not the Merge mode, the block partition manner of the current block may be determined according to a first preset condition, where the first block partition depth is greater than or equal to a maximum value of a block partition depth of the N related blocks.

There may be various specific implementation manners of determining the block partition manner of the current block according to the first preset condition. For example, the determining the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

It may be learned that, a decoder side according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the decoder side may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video decoding process.

Further, because the decoder side may determine the block partition manner of the current block based on set logic, in some scenarios, an encoder side may not write a block partition flag corresponding to the current block into a bitstream corresponding to the current block. Therefore, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

The following further provides related apparatuses configured to implement the solutions.

Figure 13:
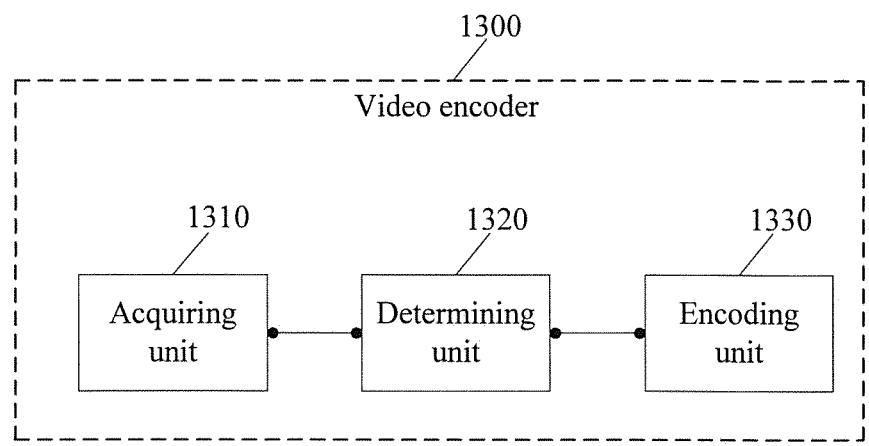
FIG. 13 is a schematic diagram of another video encoder according to an embodiment of the present invention.

Referring to FIG. 13, an embodiment of the present invention provides a video encoder 1300, which may include:

an acquiring unit 1310, a determining unit 1320, and an encoding unit 1330.

The acquiring unit 1310 is configured to acquire processing information of N related blocks of a current block.

The determining unit 1320 is configured to determine a block partition manner of the current block according to the processing information of the N related blocks; where the N related blocks include at least one neighboring block of the current block, a reference block of the current block, and/or at least one neighboring block of the reference block, the processing information is block partition depth information and/or block encoding mode information, and N is a positive integer.

The encoding unit 1330 is configured to encode the current block based on the determined block partition manner of the current block.

In some embodiments of the present invention, a block encoding mode indicated by the block encoding mode information may be a Merge mode or a Skip mode or another block encoding mode.

In some embodiments of the present invention, the determining unit 1320 may be specifically configured to: if the processing information is the block partition depth information and a block partition depth of the current block is greater than or equal to a first block partition depth, determine that the block partition manner of the current block is skipping partitioning, where the first block partition depth is greater than or equal to a maximum value of a block partition depth of the N related blocks; or if the processing information is the block encoding mode information and a block encoding mode indicated by block encoding mode information of the N related blocks is the Merge mode, determine that the block partition manner of the current block is skipping partitioning;

or if the processing information is the block partition depth information and the block encoding mode information, a block partition depth of the current block is greater than or equal to a first block partition depth, and a block encoding mode indicated by block encoding mode information of the N related blocks is the Merge mode, determine that the block partition manner of the current block is skipping partitioning, where the first block partition depth is greater than or equal to a maximum value of a block partition depth of the N related blocks.

In some embodiments of the present invention, the determining unit 1320 may be specifically configured to: if the processing information is the block partition depth information and a block partition depth of the current block is less than a first block partition depth, determine the block partition manner of the current block according to a first preset condition, where the first block partition depth is greater than or equal to a maximum value of a block partition depth of the N related blocks;

or if the processing information is the block encoding mode information and a block encoding mode indicated by block encoding mode information of at least one block of the N related blocks is not the Merge mode, determine the block partition manner of the current block according to a first preset condition;

or if the processing information is the block partition depth information and the block encoding mode information, a block partition depth of the current block is less than a first block partition depth, and a block encoding mode indicated by block encoding mode information of at least one block of the N related blocks is not the Merge mode, determine the block partition manner of the current block according to a first preset condition, where the first block partition depth is greater than or equal to a maximum value of a block partition depth of the N related blocks.

In some embodiments of the present invention, there may be various specific implementation manners of determining, by the determining unit 1320, the block partition manner of the current block according to the first preset condition. For example, the determining, by the determining unit 1320, the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, the video encoder 1300 may include:

the encoding unit 1330, further configured to: determine a block partition flag corresponding to the block partition manner of the current block; and if the processing information is the block partition depth information and the block partition depth of the current block is greater than or equal to the first block partition depth, skip carrying the block partition flag in a bitstream corresponding to the current block, where the first block partition depth is greater than or equal to the maximum value of the block partition depth of the N related blocks;

or if the processing information is the block encoding mode information and the block encoding mode indicated by the block encoding mode information of the N related blocks is the Merge mode, skip carrying the block partition flag in a bitstream corresponding to the current block;

or if the processing information is the block partition depth information and the block encoding mode information, the block partition depth of the current block is greater than or equal to the first block partition depth, and the block encoding mode indicated by the block encoding mode information of the N related blocks is the Merge mode, skip carrying the block partition flag in a bitstream corresponding to the current block, where the first block partition depth is greater than or equal to the maximum value of the block partition depth of the N related blocks.

In some embodiments of the present invention, the processing unit 1330 may further be configured to: if the processing information is the block partition depth information and the block partition depth of the current block is less than the first block partition depth, write the block partition flag into the bitstream corresponding to the current block, where the first block partition depth is greater than or equal to the maximum value of the block partition depth of the N related blocks;

or if the processing information is the block encoding mode information and the block encoding mode indicated by the block encoding mode information of the at least one block of the N related blocks is not the Merge mode, write the block partition flag into the bitstream corresponding to the current block;

or if the processing information is the block partition depth information and the block encoding mode information, the block partition depth of the current block is less than the first block partition depth, and the block encoding mode indicated by the block encoding mode information of the at least one block of the N related blocks is not the Merge mode, write the block partition flag into the bitstream corresponding to the current block, where the first block partition depth is greater than or equal to the maximum value of the block partition depth of the N related blocks.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already encoded when the first texture view is encoded, where the first texture view and the second texture view are corresponding to a same moment or different moments.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already encoded when the depth map is encoded, and the depth map and the texture view are corresponding to a same moment or different moments.

It may be understood that, function modules of the video encoder 1300 according to this embodiment may specifically be implemented according to the methods in the foregoing method embodiments. For a specific implementation process thereof, reference may be made to related descriptions of the foregoing method embodiments, and details are not described herein again.

It may be learned that, in this embodiment, a video encoder 1300 acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the video encoder may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video encoding process.

Further, because in some scenarios, the video encoder may not write a block partition flag corresponding to the current block into a bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

Figure 14:
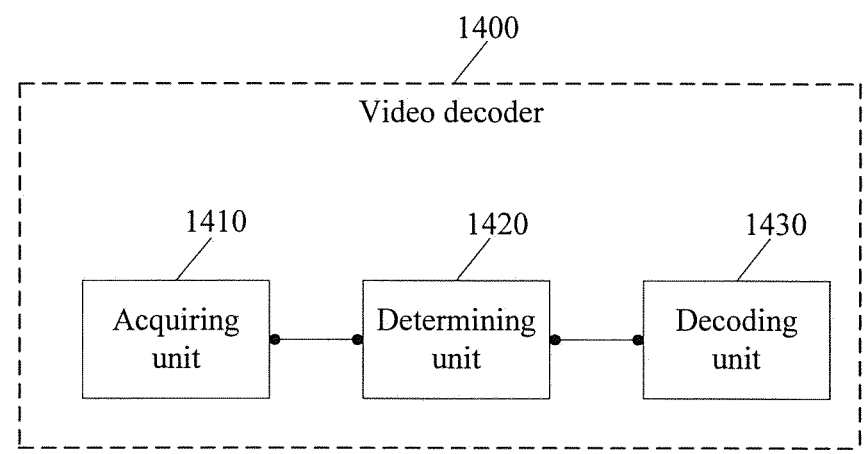
FIG. 14 is a schematic diagram of another video decoder according to an embodiment of the present invention.

Referring to FIG. 14, an embodiment of the present invention provides a video decoder 1400, which may include:

an acquiring unit 1410, a determining unit 1420, and a decoding unit 1430.

The acquiring unit 1410 is configured to acquire processing information of N related blocks of a current block.

The determining unit 1420 is configured to determine a block partition manner of the current block according to the processing information of the N related blocks; where the N related blocks include at least one neighboring block of the current block, a reference block of the current block, and/or at least one neighboring block of the reference block, the processing information is block partition depth information and/or block encoding mode information, and N is a positive integer.

The decoding unit 1430 is configured to decode, based on the determined block partition manner of the current block, a bitstream corresponding to the current block.

In some embodiments of the present invention, a block encoding mode indicated by the block encoding mode information may be a Merge mode or a Skip mode or another block encoding mode.

In some embodiments of the present invention, the determining unit 1420 may be specifically configured to: when the bitstream corresponding to the current block does not carry a block partition flag corresponding to the current block, determine the block partition manner of the current block according to the processing information of the N related blocks.

In some embodiments of the present invention, the determining unit 1420 is further configured to: when the bitstream corresponding to the current block carries the block partition flag corresponding to the current block, determine the block partition manner of the current block according to the block partition flag.

In some embodiments of the present invention, in an aspect of the determining the block partition manner of the current block according to the processing information of the N related blocks, the determining unit 1420 may be specifically configured to: if the processing information is the block partition depth information and a block partition depth of the current block is greater than or equal to a first block partition depth, determine that the block partition manner of the current block is skipping partitioning, where the first block partition depth is greater than or equal to a maximum value of a block partition depth of the N related blocks; or if the processing information is the block encoding mode information and a block encoding mode indicated by block encoding mode information of the N related blocks is the Merge mode, determine that the block partition manner of the current block is skipping partitioning;

or if the processing information is the block partition depth information and the block encoding mode information, a block partition depth of the current block is greater than or equal to a first block partition depth, and a block encoding mode indicated by block encoding mode information of the N related blocks is the Merge mode, determine that the block partition manner of the current block is skipping partitioning, where the first block partition depth is greater than or equal to a maximum value of a block partition depth of the N related blocks.

In some embodiments of the present invention, in an aspect of the determining the block partition manner of the current block according to the processing information of the N related blocks, the determining unit 1420 may be specifically configured to: if the processing information is the block partition depth information and a block partition depth of the current block is less than a first block partition depth, determine the block partition manner of the current block according to a first preset condition, where the first block partition depth is greater than or equal to a maximum value of a block partition depth of the N related blocks;

or if the processing information is the block encoding mode information and a block encoding mode indicated by block encoding mode information of at least one block of the N related blocks is not the Merge mode, determine the block partition manner of the current block according to a first preset condition;

or if the processing information is the block partition depth information and the block encoding mode information, a block partition depth of the current block is less than a first block partition depth, and a block encoding mode indicated by block encoding mode information of at least one block of the N related blocks is not the Merge mode, determine the block partition manner of the current block according to a first preset condition, where the first block partition depth is greater than or equal to a maximum value of a block partition depth of the N related blocks.

There may be various specific implementation manners of determining, by the determining unit 1420, the block partition manner of the current block according to the first preset condition. For example, the determining, by the determining unit 1420, the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×88×8. In an actual application, the first preset condition may be selected according to a requirement, and details are not described herein again.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already decoded when the first texture view is decoded, where the first texture view and the second texture view are corresponding to a same moment or different moments. It may be understood that, the foregoing scenario may be corresponding to multi-view video decoding.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already decoded when the depth map is decoded, and the depth map and the texture view are corresponding to a same moment or different moments. It may be understood that, the foregoing scenario may be corresponding to multi-view video decoding with a depth map.

It may be understood that, function modules of a video decoder 1400 according to this embodiment may specifically be implemented according to the methods in the foregoing method embodiments. For a specific implementation process thereof, reference may be made to related descriptions of the foregoing method embodiments, and details are not described herein again.

It may be learned that, in this embodiment, a video decoder 1400 acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the video decoder may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video decoding process.

Further, because the video decoder may determine the block partition manner of the current block based on set logic, in some scenarios, an encoder side may not write a block partition flag corresponding to the current block into a bitstream corresponding to the current block. Therefore, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

Figure 15:
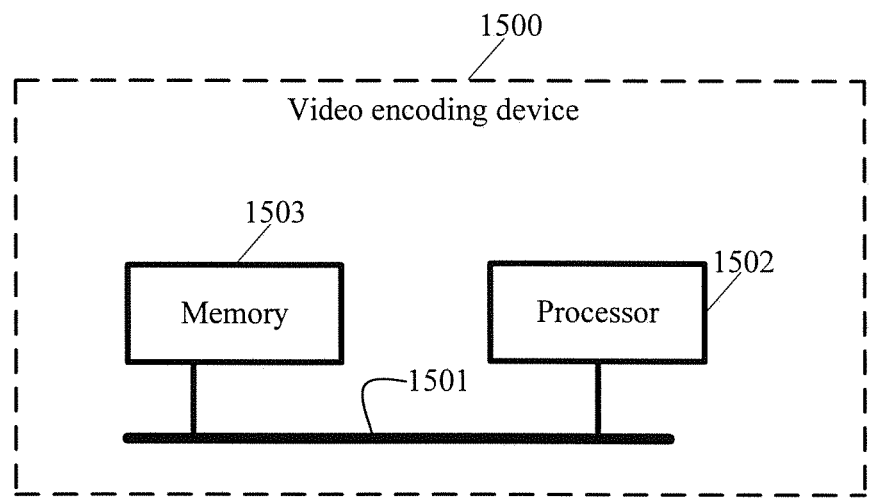
FIG. 15 is a schematic diagram of another video encoding device according to an embodiment of the present invention.

Referring to FIG. 15, FIG. 15 is a schematic diagram of a video encoding device 1500 according to an embodiment of the present invention. The video encoding device 1500 may include at least one bus 1501, at least one processor 1502 connected to the bus 1501, and at least one memory 1503 connected to the bus 1501.

The processor 1502 invokes code stored in the memory 1503 by using the bus 1501, so as to: acquire processing information of N related blocks of a current block; determine a block partition manner of the current block according to the processing information of the N related blocks; and encode the current block based on the determined block partition manner of the current block; where the processing information is block partition depth information and/or block encoding mode information, N is a positive integer, and the N related blocks include at least one of the following picture blocks: at least one neighboring block of the current block, a reference block of the current block, and at least one neighboring block of the reference block.

The processing information is the block partition depth information and/or the block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

The determining, by the processor 1502, the block partition manner of the current block may specifically be determining not to partition the current block or determining to partition the current block, that is, determining whether to partition the current block according to the processing information of the N related blocks.

In some embodiments of the present invention, a block encoding mode indicated by the block encoding mode information may be a Merge mode or a Skip mode or another block encoding mode.

The processing information of the N related blocks is block partition depth information and/or block encoding mode information of the N related blocks. Therefore, the processor 1502 may determine, based on multiple manners, the block partition manner of the current block according to the processing information of the N related blocks.

For example, the determining, by the processor 1502, the block partition manner of the current block according to the processing information of the N related blocks may include: if the processing information is the block partition depth information and a block partition depth of the current block is greater than or equal to a first block partition depth, determining that the block partition manner of the current block is skipping partitioning, where the first block partition depth is greater than or equal to a maximum value of a block partition depth of the N related blocks; or, if the processing information is the block encoding mode information and a block encoding mode indicated by block encoding mode information of the N related blocks is the Merge mode, determining that the block partition manner of the current block is skipping partitioning; or, if the processing information is the block partition depth information and the block encoding mode information, a block partition depth of the current block is greater than or equal to a first block partition depth, and a block encoding mode indicated by block encoding mode information of the N related blocks is the Merge mode, determining that the block partition manner of the current block is skipping partitioning, where the first block partition depth is greater than or equal to a maximum value of a block partition depth of the N related blocks. It is found, through tests, that the foregoing example of determining the block partition manner of the current block features simple computation and higher reliability, and has a relatively high implementation value.

For another example, the determining, by the processor 1502, the block partition manner of the current block according to the processing information of the N related blocks may include that: if the processing information is the block partition depth information and a block partition depth of the current block is less than a first block partition depth, it may be determined that the block partition manner of the current block is partitioning, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, it may be determined that the block partition manner of the current block is partitioning; or, if the processing information is the block partition depth information and the block encoding mode information, a block partition depth of the current block is less than a first block partition depth, and a block encoding mode indicated by block encoding mode information of at least one block of the N related blocks is not the Merge mode, it may be determined that the block partition manner of the current block is partitioning, where the first block partition depth is greater than or equal to a maximum value of a block partition depth of the N related blocks.

For another example, the determining, by the processor 1502, the block partition manner of the current block according to the processing information of the N related blocks may include that: if the processing information is the block partition depth information and a block partition depth of the current block is less than a first block partition depth, the block partition manner of the current block may be determined according to a first preset condition, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, the block partition manner of the current block may be determined according to a first preset condition; or, if the processing information is the block partition depth information and the block encoding mode information, a block partition depth of the current block is less than a first block partition depth, and a block encoding mode indicated by block encoding mode information of at least one block of the N related blocks is not the Merge mode, the block partition manner of the current block may be determined according to a first preset condition, where the first block partition depth is greater than or equal to a maximum value of a block partition depth of the N related blocks.

There may be various specific implementation manners of determining, by the processor 1502, the block partition manner of the current block according to the first preset condition. For example, the determining, by the processor 1502, the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, the processor 1502 may further: determine a block partition flag corresponding to the block partition manner of the current block; and if the processing information is the block partition depth information and the block partition depth of the current block is greater than or equal to the first block partition depth, skip carrying the block partition flag in a bitstream corresponding to the current block, where the first block partition depth is greater than or equal to the maximum value of the block partition depth of the N related blocks; or, if the processing information is the block encoding mode information and the block encoding mode indicated by the block encoding mode information of the N related blocks is the Merge mode, skip carrying the block partition flag in a bitstream corresponding to the current block; or, if the processing information is the block partition depth information and the block encoding mode information, the block partition depth of the current block is greater than or equal to the first block partition depth, and the block encoding mode indicated by the block encoding mode information of the N related blocks is the Merge mode, skip carrying the block partition flag in a bitstream corresponding to the current block, where the first block partition depth is greater than or equal to the maximum value of the block partition depth of the N related blocks.

In some embodiments of the present invention, the processor 1502 may further be configured to: if the processing information is the block partition depth information and the block partition depth of the current block is less than the first block partition depth, write the block partition flag into the bitstream corresponding to the current block, where the first block partition depth is greater than or equal to the maximum value of the block partition depth of the N related blocks; or, if the processing information is the block encoding mode information and the block encoding mode indicated by the block encoding mode information of the at least one block of the N related blocks is not the Merge mode, write the block partition flag into the bitstream corresponding to the current block; or, if the processing information is the block partition depth information and the block encoding mode information, the block partition depth of the current block is less than the first block partition depth, and the block encoding mode indicated by the block encoding mode information of the at least one block of the N related blocks is not the Merge mode, write the block partition flag into the bitstream corresponding to the current block, where the first block partition depth is greater than or equal to the maximum value of the block partition depth of the N related blocks, and the block partition flag corresponding to the block partition manner of the current block indicates whether to partition the current block, where the block partition manner of the current block may be determined according to the first preset condition.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already encoded when the first texture view is encoded, where the first texture view and the second texture view are corresponding to a same moment or different moments.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already encoded when the depth map is encoded, and the depth map and the texture view are corresponding to a same moment or different moments.

It may be understood that, function modules of the video encoding device 1500 according to this embodiment may specifically be implemented according to the methods in the foregoing method embodiments. For a specific implementation process thereof, reference may be made to related descriptions of the foregoing method embodiments, and details are not described herein again.

It may be learned that, a video encoding device 1500 according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the video encoding device 1500 may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video encoding process.

Further, because in some scenarios, the video encoding device 1500 may not write a block partition flag corresponding to the current block into a bitstream corresponding to the current block, and a decoder side may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

Figure 16:
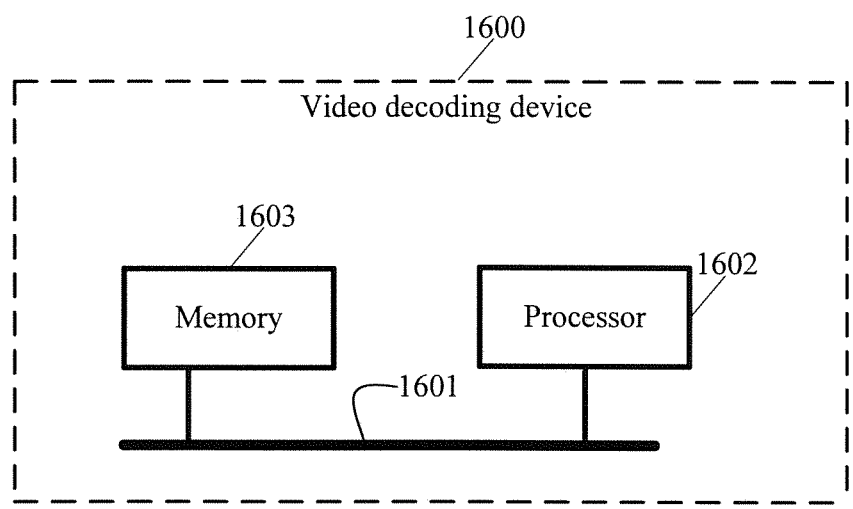
FIG. 16 is a schematic diagram of another video decoding device according to an embodiment of the present invention.

Referring to FIG. 16, FIG. 16 is a schematic diagram of a video encoding device 1600 according to an embodiment of the present invention. The video encoding device 1600 may include at least one bus 1601, at least one processor 1602 connected to the bus 1601, and at least one memory 1603 connected to the bus 1601.

The processor 1602 invokes code stored in the memory 1603 by using the bus 1601, so as to: acquire processing information of N related blocks of a current block; determine a block partition manner of the current block according to the processing information of the N related blocks; and decode a bitstream corresponding to the current block based on the determined block partition manner of the current block; where the N related blocks include at least one neighboring block of the current block, a reference block of the current block, and/or at least one neighboring block of the reference block, the processing information is block partition depth information and/or block encoding mode information, and N is a positive integer.

The processing information is the block partition depth information and/or the block encoding mode information, and N is a positive integer. The N related blocks include at least one of the following picture blocks: at least one neighboring block of the current block, a reference block of the current block, and at least one neighboring block of the reference block. For example, the N related blocks may include at least one neighboring block of four neighboring blocks of the current block (in this scenario, N is a positive integer); or the N related blocks may include a reference block of the current block (in this scenario, N is a positive integer equal to 1); or the N related blocks may include at least one neighboring block of four neighboring blocks of a reference block of the current block (in this scenario, N is a positive integer); or the N related blocks may include a reference block of the current block and at least one neighboring block of four neighboring blocks of the current block (in this scenario, N is a positive integer greater than 1); or the N related blocks may include a reference block of the current block and at least one neighboring block of four neighboring blocks of the reference block (in this scenario, N is a positive integer greater than 1); or the N related blocks may include at least one neighboring block of four neighboring blocks of the current block and at least one neighboring block of four neighboring blocks of a reference block of the current block (in this scenario, N is a positive integer greater than 1); or the N related blocks may include at least one neighboring block of the current block, a reference block of the current block, and at least one neighboring block of the reference block (in this scenario, N is a positive integer greater than 2).

The determining, by the processor 1602, the block partition manner of the current block may specifically be determining not to partition the current block or determining to partition the current block, that is, determining whether to partition the current block according to the processing information of the N related blocks.

In some embodiments of the present invention, a block encoding mode indicated by the block encoding mode information may be a Merge mode or a Skip mode or another block encoding mode.

The processing information of the N related blocks is block partition depth information and/or block encoding mode information of the N related blocks. Therefore, the processor 1602 may determine, based on multiple manners, the block partition manner of the current block according to the processing information of the N related blocks.

In some embodiments of the present invention, the determining, by the processor 1602, the block partition manner of the current block according to the processing information of the N related blocks may include: when the bitstream corresponding to the current block does not carry a block partition flag corresponding to the current block, determining the block partition manner of the current block according to the processing information of the N related blocks. Further, when the bitstream corresponding to the current block carries the block partition flag corresponding to the current block, the processor 1602 may also determine the block partition manner of the current block, for example, according to the block partition flag, and then decode the bitstream corresponding to the current block based on the determined block partition manner of the current block. Alternatively, when the bitstream corresponding to the current block carries the block partition flag corresponding to the current block, the block partition manner of the current block may also be determined, for example, according to the processing information of the N related blocks.

It may be understood that, because in some scenarios, an encoder may not write the block partition flag corresponding to the current block into the bitstream corresponding to the current block, and the video decoding device 1600 may determine the block partition manner of the current block based on set logic, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

For example, the determining, by the processor 1602, the block partition manner of the current block according to the processing information of the N related blocks may include that: if the processing information is the block partition depth information and a block partition depth of the current block is greater than or equal to a first block partition depth, it may be determined that the block partition manner of the current block is skipping partitioning, where the first block partition depth is greater than or equal to a maximum value of a block partition depth of the N related blocks; or, if the processing information is the block encoding mode information and a block encoding mode indicated by block encoding mode information of the N related blocks is the Merge mode, it is determined that the block partition manner of the current block is skipping partitioning; or, if the processing information is the block partition depth information and the block encoding mode information, a block partition depth of the current block is greater than or equal to a first block partition depth, and a block encoding mode indicated by block encoding mode information of the N related blocks is the Merge mode, it is determined that the block partition manner of the current block is skipping partitioning, where the first block partition depth is greater than or equal to a maximum value of a block partition depth of the N related blocks. It is found, through tests, that the foregoing several exemplary mechanisms of determining the block partition manner of the current block feature simple computation and higher reliability, and have a relatively high implementation value.

For another example, the determining, by the processor 1602, the block partition manner of the current block according to the processing information of the N related blocks may include that: if the processing information is the block partition depth information and a block partition depth of the current block is less than a first block partition depth, it may be determined that the block partition manner of the current block is partitioning, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, it may be determined that the block partition manner of the current block is partitioning; or, if the processing information is the block partition depth information and the block encoding mode information, a block partition depth of the current block is less than a first block partition depth, and a block encoding mode indicated by block encoding mode information of at least one block of the N related blocks is not the Merge mode, it may be determined that the block partition manner of the current block is partitioning, where the first block partition depth is greater than or equal to a maximum value of a block partition depth of the N related blocks.

For another example, the determining, by the processor 1602, the block partition manner of the current block according to the processing information of the N related blocks may include that: if the processing information is the block partition depth information and a block partition depth of the current block is less than a first block partition depth, the block partition manner of the current block may be determined according to a first preset condition, where the first block partition depth is greater than or equal to a maximum value of a block partition depth of the N related blocks; or, if the processing information is the block encoding mode information and a block encoding mode indicated by block encoding mode information of at least one block of the N related blocks is not the Merge mode, the block partition manner of the current block may be determined according to a first preset condition; or, if the processing information is the block partition depth information and the block encoding mode information, a block partition depth of the current block is less than a first block partition depth, and a block encoding mode indicated by block encoding mode information of at least one block of the N related blocks is not the Merge mode, the block partition manner of the current block may be determined according to a first preset condition, where the first block partition depth is greater than or equal to a maximum value of a block partition depth of the N related blocks.

There may be various specific implementation manners of determining, by the processor 1602, the block partition manner of the current block according to the first preset condition. For example, the determining, by the processor 1602, the block partition manner of the current block according to the first preset condition may include: if performance of rate distortion corresponding to a current block partitioned is higher than performance of rate distortion corresponding to the current block unpartitioned, determining to partition the current block, or if performance of rate distortion corresponding to a current block partitioned is lower than performance of rate distortion corresponding to the current block unpartitioned, determining not to partition the current block; or a block partition depth of the current block is less than a second block partition depth threshold, determining to partition the current block, or if a block partition depth of the current block is greater than or equal to a second block partition depth threshold, determining not to partition the current block; or, if a block size of the current block is greater than a size of a minimal block allowed for a picture to which the current block belongs, determining to partition the current block, or a block size of the current block is less than or equal to a size of a minimal block allowed for a picture to which the current block belongs, determining not to partition the current block. A size of a minimal block of a current picture may be a preset block size corresponding to a maximum partitionable depth of a picture block. For example, a 64×64 picture block is partitioned according to a maximum partition depth of four levels, a level-0 block size is 64×64, a level-1 block size is 32×32, a level-2 block size is 16×16, and a level-3 block size is 8×8; then, a minimal block size is 8×8. In an actual application, the first preset condition may be selected according to a requirement, and details are not described herein again.

In some embodiments of the present invention, if the N related blocks include a reference block of the current block and/or at least one neighboring block of the reference block, the current block belongs to a first texture view, and the reference block and the at least one neighboring block of the reference block belong to a second texture view. For example, the second texture view is a reference view of the first texture view; or the first texture view is a dependent view, and the second texture view is a benchmark view or a dependent view already decoded when the first texture view is decoded, where the first texture view and the second texture view are corresponding to a same moment or different moments. It may be understood that, the foregoing scenario may be corresponding to multi-view video decoding.

In some other embodiments of the present invention, if the N related blocks include a reference block of the current block and/or at least one neighboring block of the reference block, the current block belongs to a depth map, and the reference block and the at least one neighboring block of the reference block belong to a texture view. For example, the depth map and the texture view are corresponding to a same view or difference views; where the texture view is a texture view already decoded when the depth map is decoded, and the depth map and the texture view are corresponding to a same moment or different moments. It may be understood that, the foregoing scenario may be corresponding to multi-view video decoding with a depth map.

It may be understood that, function modules of the video decoding device 1600 according to this embodiment may specifically be implemented according to the methods in the foregoing method embodiments. For a specific implementation process thereof, reference may be made to related descriptions of the foregoing method embodiments, and details are not described herein again.

It may be learned that, a video decoding device 1600 according to this embodiment acquires processing information of N related blocks of a current block; and determines a block partition manner of the current block according to the processing information of the N related blocks; where the N related blocks include at least one neighboring block of the current block, a reference block of the current block, and/or at least one neighboring block of the reference block, N is a positive integer, and the processing information is block partition depth information and/or block encoding mode information. Because the video decoding device 1600 may determine the block partition manner of the current block according to the processing information (that is, the block partition depth information and/or the block encoding mode information, and the like) of the N related blocks of the current block, instead of determining the block partition manner of the current block by calculating, for each time, a performance parameter such as rate distortion of multiple blocks, it helps reduce computational complexity in determining a block partition manner of a current block in a video decoding process.

Further, because the video decoding device 1600 may determine the block partition manner of the current block based on set logic, in some scenarios, an encoder side may not write a block partition flag corresponding to the current block into a bitstream corresponding to the current block. Therefore, it helps reduce bitstream load to an extent. This is because: when partition of the current block (for example, a CU) is relatively complex, if the block partition flag corresponding to the current block is written into the bitstream corresponding to the current block in all cases, the block partition flag may occupy a relatively large proportion in the bitstream.

It may be understood that, because the encoder side and the decoder side in embodiments of the present invention may determine a partition manner of a current block based on same logic, consistency between encoding and decoding processing may be ensured.

An embodiment of the present invention further provides a computer storage medium, where the computer storage medium may store a program, and the program executes some or all steps, recorded in the foregoing method embodiments, of the method for determining a block partition manner in video encoding.

An embodiment of the present invention further provides a computer storage medium, where the computer storage medium may store a program, and the program executes some or all steps, recorded in the foregoing method embodiments, of the method for determining a block partition manner in video decoding.

An embodiment of the present invention further provides a computer storage medium, where the computer storage medium may store a program, and the program executes some or all steps, recorded in the foregoing method embodiments, of the method for determining a block partition manner in video encoding and the method for determining a block partition flag encoding manner in video decoding.

An embodiment of the present invention further provides a computer storage medium, where the computer storage medium may store a program, and the program executes some or all steps, recorded in the foregoing method embodiments, of the method for determining a block partition manner in video encoding and the method for determining a block partition flag encoding manner in video decoding.

It should be noted that, for brief description, the foregoing method embodiments are described as a series of action combinations. However, a person skilled in the art should understand that the present invention is not limited to the described sequence of the actions, because according to the present invention, some steps may be performed in another sequence or simultaneously. In addition, a person skilled in the art should also understand that all the embodiments described in this specification belong to exemplary embodiments, and the involved actions and modules are not necessarily mandatory to the present invention.

In the foregoing embodiments, the description of each embodiment has respective focuses. For a part that is not described in detail in an embodiment, refer to related descriptions in other embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a read-only memory (ROM, Read-Only Memory), a random access memory (RAM, Random Access Memory), a removable hard disk, a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for determining a block partition manner in video encoding, the method comprising:
   acquiring processing information of N related blocks of a current block, the processing information comprising block partition depth information and a block encoding mode of the N related blocks; and
   when the block encoding mode of the N related blocks is a Merge mode and a block partition depth of the current block is greater than or equal to a maximum value of a block partition depth of the N related blocks, determining that a block partition manner of the current block is skipping partitioning,
   wherein N is a positive integer, and the N related blocks comprise at least one of the following picture blocks: at least one neighboring block of the current block, a reference block of the current block, and at least one neighboring block of the reference block.

2. The method according to claim 1, further comprising:
   determining a block partition flag corresponding to the block partition manner of the current block; and
   when the block partition depth of the current block is greater than or equal to the maximum value of the block partition depth of the N related blocks, skipping carrying the block partition flag in a bitstream corresponding to the current block.

3. The method according to claim 1, wherein:
   when the N related blocks comprise at least one of a reference block of the current block and one or more neighboring blocks of the reference block, the current block belongs to a first texture view, and the at least one of the reference block and the one or more neighboring blocks of the reference block belong to a second texture view.

4. The method according to claim 3, wherein:
   the second texture view is a reference view of the first texture view; or
   the first texture view is a dependent view, and the second texture view is a benchmark view or a dependent view already encoded when the first texture view is encoded, wherein the first texture view and the second texture view correspond to a same moment or different moments.

5. The method according to claim 1, wherein:
   when the N related blocks comprise at least one of a reference block of the current block and one or more neighboring blocks of the reference block, the current block belongs to a depth map, and the at least one of the reference block and the one or more neighboring blocks of the reference block belong to a texture view.

6. The method according to claim 5, wherein:
   the depth map and the texture view correspond to a same view or difference views; and
   the texture view is already encoded when the depth map is encoded, and the depth map and the texture view correspond to a same moment or different moments.

7. A method for determining a block partition manner in video decoding, the method comprising:
   acquiring processing information of N related blocks of a current block; and
   when a bitstream corresponding to the current block does not carry a block partition flag corresponding to the current block and if a block partition depth of the current block is greater than or equal to a first block partition depth, determining a block partition manner of the current block is skipping partitioning, the first block partition depth being greater than or equal to a maximum value of a block partition depth of the N related blocks, wherein the processing information comprises block partition depth information and block encoding mode information, a block encoding mode indicated by the block encoding mode information is a Merge mode, N is a positive integer, and the N related blocks comprise at least one of the following picture blocks: at least one neighboring block of the current block, a reference block of the current block, and at least one neighboring block of the reference block.

8. The method according to claim 7, wherein the method further comprises:
when the bitstream corresponding to the current block carries the block partition flag corresponding to the current block, determining the block partition manner of the current block according to the block partition flag.

9. The method according to claim 7, wherein:
when the N related blocks comprise at least one of a reference block of the current block and one or more neighboring blocks of the reference block, the current block belongs to a first texture view, and the at least one of the reference block and the one or more neighboring blocks of the reference block belong to a second texture view.

10. The method according to claim 9, wherein:
the second texture view is a reference view of the first texture view; or
the first texture view is a dependent view, and the second texture view is a benchmark view or a dependent view already decoded when the first texture view is decoded, wherein the first texture view and the second texture view correspond to a same moment or different moments.

11. The method according to claim 7, wherein:
when the N related blocks comprise at least one of a reference block of the current block and one or more neighboring blocks of the reference block, the current block belongs to a depth map, and the at least one of the reference block and the one or more neighboring blocks of the reference block belong to a texture view.

12. The method according to claim 11, wherein:
the depth map and the texture view correspond to a same view or difference views; and
the texture view is already decoded when the depth map is decoded, and the depth map and the texture view correspond to a same moment or different moments.

13. A video encoder, comprising:
a processor configured to:
acquire processing information of N related blocks of a current block, the processing information comprising block partition depth information and a block encoding mode of the N related blocks; and when the block encoding mode of the N related blocks is a Merge mode and a block partition depth of the current block is greater than or equal to a maximum value of a block partition depth of the N related blocks, determine that a block partition manner of the current block is skipping partitioning,
wherein N is a positive integer, and the N related blocks comprise at least one of the following picture blocks: at least one neighboring block of the current block, a reference block of the current block, and at least one neighboring block of the reference block.

14. The video encoder according to claim 13, wherein the processor is further configured to:
determine a block partition flag corresponding to the block partition manner of the current block; and
when the block partition depth of the current block is greater than or equal to a the maximum value of the block partition depth of the N related blocks, skip carrying the block partition flag in a bitstream corresponding to the current block.

15. A video decoder, comprising:
a processor configured to:
acquire processing information of N related blocks of a current block; and
when a bitstream corresponding to the current block does not carry a block partition flag corresponding to the current block and if a block partition depth of the current block is greater than or equal to a first block partition depth, determine a block partition manner of the current block is skipping partitioning, the first block partition depth being greater than or equal to a maximum value of a block partition depth of the N related blocks, wherein the processing information comprises block partition depth information and block encoding mode information, a block encoding mode indicated by the block encoding mode information is a Merge mode, N is a positive integer, and the N related blocks comprise at least one of the following picture blocks: at least one neighboring block of the current block, a reference block of the current block, and at least one neighboring block of the reference block.

16. The video decoder according to claim 15, wherein the processor is further configured to:
when the bitstream corresponding to the current block carries the block partition flag corresponding to the current block, determine the block partition manner of the current block according to the block partition flag.

* * * * *